US010326292B2

(12) United States Patent
Zeisler et al.

(10) Patent No.: US 10,326,292 B2
(45) Date of Patent: Jun. 18, 2019

(54) BATTERY CHARGER OPERATING METHOD AND METHOD USABLE WITH PLURAL DIFFERENT POWER SUPPLIES

(71) Applicant: Streamlight, Inc., Eagleville, PA (US)

(72) Inventors: Jon C. Zeisler, Audubon, PA (US); Raymond L. Sharrah, Collegeville, PA (US); Peter J. Ziegenfuss, Sellersville, PA (US); Thomas D. Boris, Collegeville, PA (US)

(73) Assignee: Streamlight, Inc., Eagleville, PA (US)

( * ) Notice: Subject to any disclaimer, the term of this patent is extended or adjusted under 35 U.S.C. 154(b) by 0 days.

(21) Appl. No.: 15/963,768

(22) Filed: Apr. 26, 2018

(65) Prior Publication Data

US 2018/0254649 A1   Sep. 6, 2018

Related U.S. Application Data

(62) Division of application No. 15/053,606, filed on Feb. 25, 2016, now Pat. No. 9,960,622, and a division of
(Continued)

(51) Int. Cl.
*H02J 7/00*        (2006.01)
*H01M 10/46*     (2006.01)
(Continued)

(52) U.S. Cl.
CPC .......... *H02J 7/0052* (2013.01); *H01M 10/44* (2013.01); *H01M 10/46* (2013.01); *H01R 13/64* (2013.01); *H01R 27/00* (2013.01); *H02J 7/0008* (2013.01); *H02J 7/0031* (2013.01); *H02J 7/0045* (2013.01); *H02J 7/0047* (2013.01); *H02J 7/0081* (2013.01); *H02J 7/0091* (2013.01); *H02J 7/085* (2013.01);
(Continued)

(58) Field of Classification Search
CPC ............ H02J 7/0052; H02J 2007/0062; H02J 7/0008; H02J 7/0045; H02J 7/0047; H02J 7/0081; H02J 7/0091; H02J 7/085; H02J 7/087; H02J 7/0031; H01M 10/46; H01R 13/64; H01R 27/00; F21L 4/022
USPC ....................................................... 320/107
See application file for complete search history.

(56) References Cited

U.S. PATENT DOCUMENTS 4,092,580 A    5/1978   Prinsze
D351,675 S    10/1994  Sharrah et al.
(Continued)

OTHER PUBLICATIONS

Stream light, Inc., "Product Fact Sheet—STRION", Issued: Oct. 1, 2004, Revised: Jul. 18, 2013, Rev. 3, Document #145, 1 page.
(Continued)

*Primary Examiner* — Sun J Lin
(74) *Attorney, Agent, or Firm* — Clement A. Berard, Esq.; Dann, Dorfman, Herrell & Skillman, PC

(57) ABSTRACT

A method for charging a battery may comprise: setting an initial low charge current level; repetitively interrupting charging in a periodic cycle, and: measuring an open circuit battery voltage when charging is interrupted, determining from the open circuit battery voltage a corresponding predetermined charging current; applying the predetermined charging current; and repeating the periodic cycle. A method may also comprise: setting an initial charge current level, measuring the supply voltage, and decreasing the charge current level if the measured supply voltage is less than a predetermined voltage.

25 Claims, 19 Drawing Sheets

Related U.S. Application Data application No. 15/053,539, filed on Feb. 25, 2016, now Pat. No. 9,960,621.

(60) Provisional application No. 62/249,606, filed on Nov. 2, 2015, provisional application No. 62/132,037, filed on Mar. 12, 2015.

(51) Int. Cl.
| | |
|---|---|
| *H01R 13/64* | (2006.01) |
| *H01R 27/00* | (2006.01) |
| *H02J 7/08* | (2006.01) |
| *H01M 10/44* | (2006.01) |
| *H01R 103/00* | (2006.01) |
| *H01R 24/62* | (2011.01) |
| *H01R 24/76* | (2011.01) |
| *H01R 107/00* | (2006.01) |
| *F21L 4/02* | (2006.01) |
| *F21L 4/08* | (2006.01) |
| *F21Y 115/10* | (2016.01) |

(52) U.S. Cl.
CPC ............ *H02J 7/087* (2013.01); *F21L 4/022* (2013.01); *F21L 4/085* (2013.01); *F21Y 2115/10* (2016.08); *H01R 24/62* (2013.01); *H01R 24/76* (2013.01); *H01R 2103/00* (2013.01); *H01R 2107/00* (2013.01); *H02J 2007/0049* (2013.01); *H02J 2007/0062* (2013.01)

(56) References Cited

U.S. PATENT DOCUMENTS

| | | | |
|---|---|---|---|
| D353,216 S | 12/1994 | Sharrah et al. |
| 5,432,689 A | 7/1995 | Sharrah et al. |
| 5,633,574 A | 5/1997 | Sage |
| 5,764,030 A | 6/1998 | Gaza |
| 6,002,237 A | 12/1999 | Gaza |
| 6,056,578 A | 5/2000 | Lin |
| 6,099,147 A | 8/2000 | Ziegenfuss |
| 6,104,162 A | 8/2000 | Sainsbury et al. |
| RE37,092 E | 3/2001 | Sharrah et al. |
| 6,626,706 B2 | 9/2003 | Siddiqui et al. |
| 6,633,152 B2 | 10/2003 | Sharrah et al. |
| 6,652,115 B2 | 11/2003 | Sharrah |
| 6,762,584 B2 | 7/2004 | Harvey |
| 6,830,472 B1 | 12/2004 | Wu |
| 7,220,013 B2 | 5/2007 | Sharrah et al. |
| 7,753,713 B2 | 7/2010 | Neale, III |
| 7,825,615 B2 | 11/2010 | Chen et al. |
| 7,891,833 B2 | 2/2011 | Sharrah et al. |
| 8,888,311 B2 | 11/2014 | Parsons |
| 9,960,621 B2 | 5/2018 | Ziegenfuss et al. |
| 9,960,622 B2 | 5/2018 | Ziegenfuss et al. |
| 2002/0158605 A1 | 10/2002 | Sharrah et al. |
| 2003/0157836 A1 | 8/2003 | Morikawa et al. |
| 2006/0091852 A1 | 5/2006 | Watson |
| 2007/0171082 A1 | 7/2007 | Melnik |
| 2007/0182368 A1 | 8/2007 | Yang |
| 2008/0061739 A1 | 3/2008 | Lu |
| 2008/0111521 A1 | 5/2008 | So et al. |
| 2008/0150480 A1 | 6/2008 | Navid |
| 2008/0174265 A1 | 7/2008 | Toya |
| 2008/0248671 A1 | 10/2008 | Chawgo |
| 2008/0299824 A1 | 12/2008 | Legg |
| 2008/0311791 A1 | 12/2008 | Neale |
| 2012/0033414 A1 | 2/2012 | Sharrah et al. |
| 2014/0191707 A1 | 7/2014 | Carreon et al. |
| 2014/0240967 A1 | 8/2014 | Sharrah et al. |
| 2016/0268731 A1 | 9/2016 | Ziegenfuss et al. |
| 2016/0268827 A1 | 9/2016 | Ziegenfuss et al. |

OTHER PUBLICATIONS

Stream light, Inc., "STRION", printed Sep. 21, 2015, 2 pages, http://www.streamlight.com/en-us/product/product.html?pid=3.

Streamlight, Inc., "STRION Charger Operating Instructions", © 2007, Rev. B, 6 pages.

Streamlight, Inc., "STRION light charger pictures", ca. 2008, 4 pages.

PCT International Searching Authority, "Notification of Transmittal of the International Search Report and the Written Opinion of the International Searching Authority, or the Declaration", in PCT/US2016/021767, dated Jul. 26, 2016, 17 pages.

USPTO, "Office Action", U.S. Appl. No. 15/053,539, dated Aug. 31, 2017, 15 pages.

USPTO, "Office Action", U.S. Appl. No. 15/053,606, dated Sep. 26, 2017, 7 Pages.

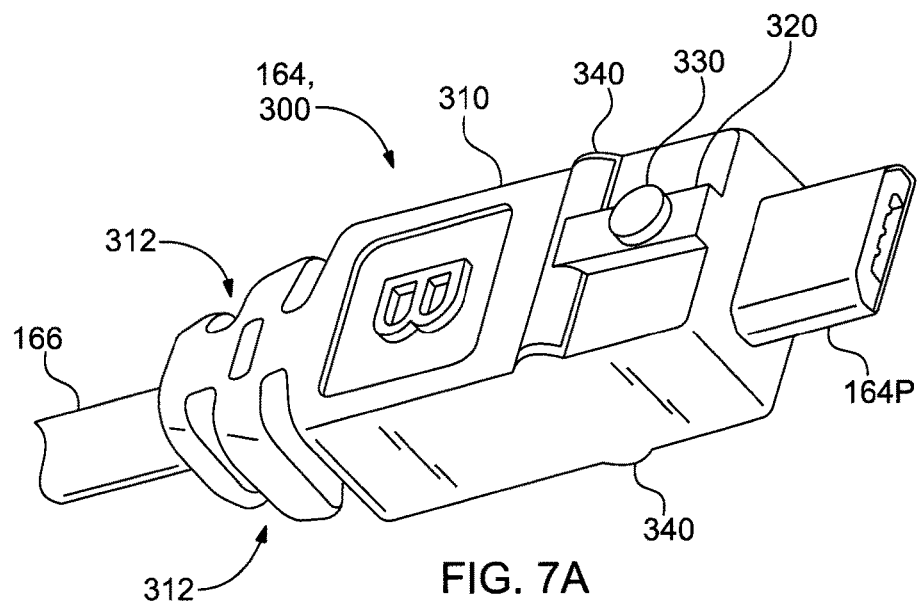
FIG. 7A
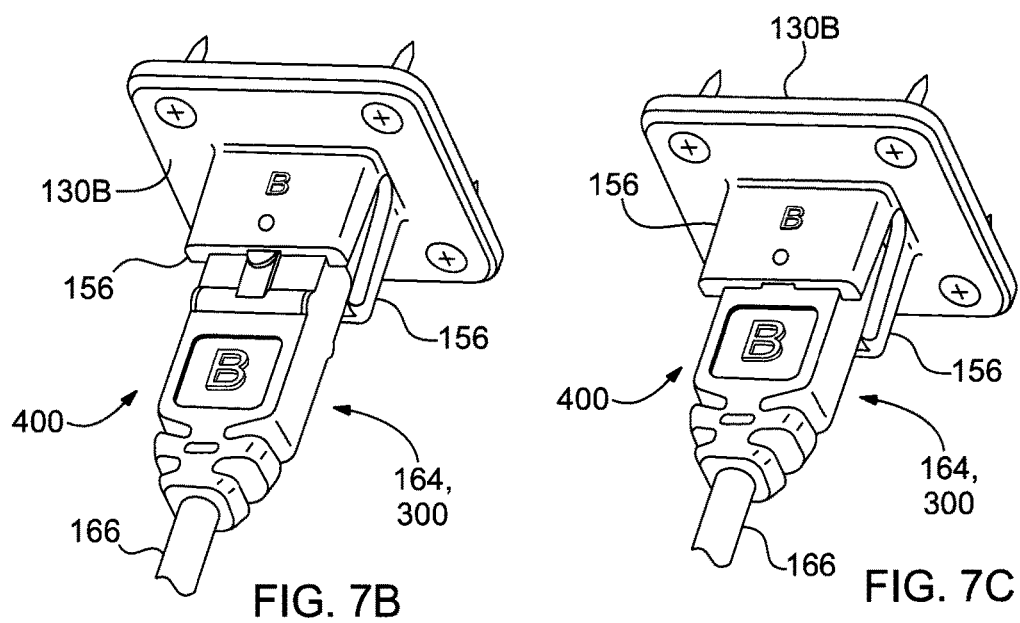
FIG. 7B
FIG. 7C

BATTERY CHARGER OPERATING METHOD AND METHOD USABLE WITH PLURAL DIFFERENT POWER SUPPLIES

This Application is a division of U.S. patent application Ser. No. 15/053,539 filed Feb. 25, 2016 entitled "USB CONNECTOR USABLE WITH A BATTERY CHARGER AND OTHERWISE," and is also a division of U.S. patent application Ser. No. 15/053,606 filed Feb. 25, 2016 entitled "BATTERY CHARGER USABLE WITH PLURAL DIFFERENT POWER SUPPLIES," both of which claim the benefit of U.S. Provisional Application Ser. No. 62/249,606 filed Nov. 2, 2015 entitled "BATTERY CHARGER USABLE WITH PLURAL DIFFERENT POWER SUPPLIES," and of U.S. Provisional Application Ser. No. 62/132,037 filed Mar. 12, 2015 entitled "BATTERY CHARGER USABLE WITH PLURAL DIFFERENT POWER SUPPLIES," each of which is hereby incorporated herein by reference in its entirety.

In one aspect, the invention relates to a method for charging one or more batteries. The invention also relates to a method for operating a battery charger.

In another aspect, the invention may relate to a connector arrangement usable with the battery charger and otherwise. In yet another aspect, the present invention may relate to a battery charger and, in particular, to a battery charger usable with plural different power supplies.

As the size and power requirements of electronic circuitry has shrunk and the energy storage capacity of batteries per unit volume has increased, more and more types of electronic devices shrink in size and become more portable, thus lending themselves to charging from lower power capacity power supply devices as well as from conventional power supplies. Typically power supplies have distinctive connectors, or a variety of relatively standardized power connectors, e.g., coaxial contact connectors of different voltages, currents, polarity and diameters, and so are not interchangeable with each other.

Also, as more electronic devices transmit and receive data via connecting cables, and to and from external memory devices, e.g., external drives and "thumb" or flash drives, a standardized interface called a universal serial bus (USB) interface has become the standard for interconnection with and between electronic devices. The USB interface includes a pair of male and female mating connectors that have power pins for +5 volts DC and ground or return, and two pins for data transmission.

While the current available from the +5 Volt DC (herein VDC) USB connector power supply pin can vary greatly, e.g., from a standard level of one hundred milliamperes, e.g., from a device such as a laptop computer, but possibly to a greater current, e.g., up to about 1.8 or about 2.4 amperes from a power supply, it is usually able to provide a level of current that is sufficient for recharging a rechargeable battery, even if at a less than optimum or less than maximum charge rate. The longer charging time is often an acceptable penalty in exchange for the convenience of using an available USB port to recharge a device.

In another aspect, conventional USB connectors, such as those usable with battery charging, can be damaged relatively easily if not properly aligned and/or oriented when being connected, e.g., mated with a compatible connector, and also may be subject to being dislodged or de-mated unintentionally.

Applicant believes there may be a need for a battery charger and for a method for operating a battery charger that addresses some or all of the foregoing battery charger related aspects. In addition, Applicant also believes there may be a need for a connector that addresses some or all of the foregoing connector related aspects.

Accordingly, a battery charger may comprise: a housing having at least one cradle; a connector port for receiving at different times electrical plug connectors having different contact configurations; electrical receptacles in the connector port for receiving at different times electrical plug connectors associated with different electrical power supplies; a first electrical receptacle having a different contact configuration than a second electrical receptacle; the electrical receptacles being closely adjacent such that an electrical connector inserted into one of the electrical receptacles physically prevents an electrical connector from being inserted into the other electrical receptacle; and an electrical circuit coupling electrical power received at the electrical receptacles to the at least one cradle.

In another aspect, an electrical connector may comprise: an elongated connector body with an electrical connector frame at one end thereof; the connector body having a longitudinal alignment feature, a guide feature defining an orientation, and a retaining feature.

An electrical connector may comprise: an electrical connector frame supported on a base; an alignment and retaining structure including first and second opposing guide members configured for an elongated connector body to be placed therebetween to mate with the electrical connector frame; the first guide member configured to align a complementary feature of the connector body and to receive a guide feature on the connector body that defines an orientation; and at least one of the first and second guide members having a retaining feature configured to engage the connector body for retaining the elongated connector body between the first and second guide members with the connector body mated with the electrical connector frame.

In yet another aspect, a method for charging a battery may comprise:
a) determining whether a battery is present;
b) setting an initial charge current level;
c) repetitively interrupting charging of the battery at a predetermined timing to define a periodic cycle, and for each periodic cycle:
measuring an open circuit voltage of the battery when charging of the battery is interrupted,
determining from the measured open circuit voltage a level of charging current;
applying charging current to the battery; and
d) repeating the periodic cycle at least until the open circuit voltage is at a voltage indicative of the battery being fully charged or until the battery is disconnected.

According to another aspect, a method for charging a rechargeable battery may comprise:
a) determining whether a battery is present;
b) setting an initial charge current level;
c) determining the current available from an external power supply including:
i) measuring a voltage provided by the external power supply;
ii) determining whether the external power supply voltage is less than a predetermined voltage and, if so:
iii) decreasing the current drawn from the external power supply;
d) repeating the foregoing steps of i) measuring, ii) determining and iii) decreasing until the external power supply voltage is not less than the predetermined voltage.

According to a further aspect, a method for charging a rechargeable battery may comprise:
 a) determining whether a battery is present;
 b) setting an initial charge current level;
 c) determining the current available from an external power supply including:
  i) measuring a voltage provided by the external power supply;
  ii) determining whether the external power supply voltage is less than a predetermined voltage and, if so:
  iii) decreasing the current drawn from the external power supply;
 d) repeating the foregoing steps of i) measuring, ii) determining and iii) decreasing until the external power supply voltage is not less than the predetermined voltage; and
 e) repetitively interrupting charging of the battery at a predetermined timing to define a periodic cycle, and for each periodic cycle:
  i) measuring an open circuit voltage of the battery when charging of the battery is interrupted,
  ii) determining from the measured open circuit voltage a level of charging current;
  iii) applying charging current to the battery; and
 f) repeating the periodic cycle at least until the open circuit voltage is at a voltage indicative of the battery being fully charged or until the battery is disconnected.

In summarizing the arrangements described and/or claimed herein, a selection of concepts and/or elements and/or steps that are described in the detailed description herein may be made or simplified. Any summary is not intended to identify key features, elements and/or steps, or essential features, elements and/or steps, relating to the claimed subject matter, and so are not intended to be limiting and should not be construed to be limiting of or defining of the scope and breadth of the claimed subject matter.

BRIEF DESCRIPTION OF THE DRAWING

The detailed description of the preferred embodiment(s) will be more easily and better understood when read in conjunction with the FIGURES of the Drawing which include:

FIGS. 7A, 7B and 7C are respective perspective views of an example embodiment of an alternative connector, and of the alternative connector partially inserted and fully inserted in the connector port of the example embodiment of a battery charger including an example embodiment of an alignment and retaining arrangement.

Figure 1A:
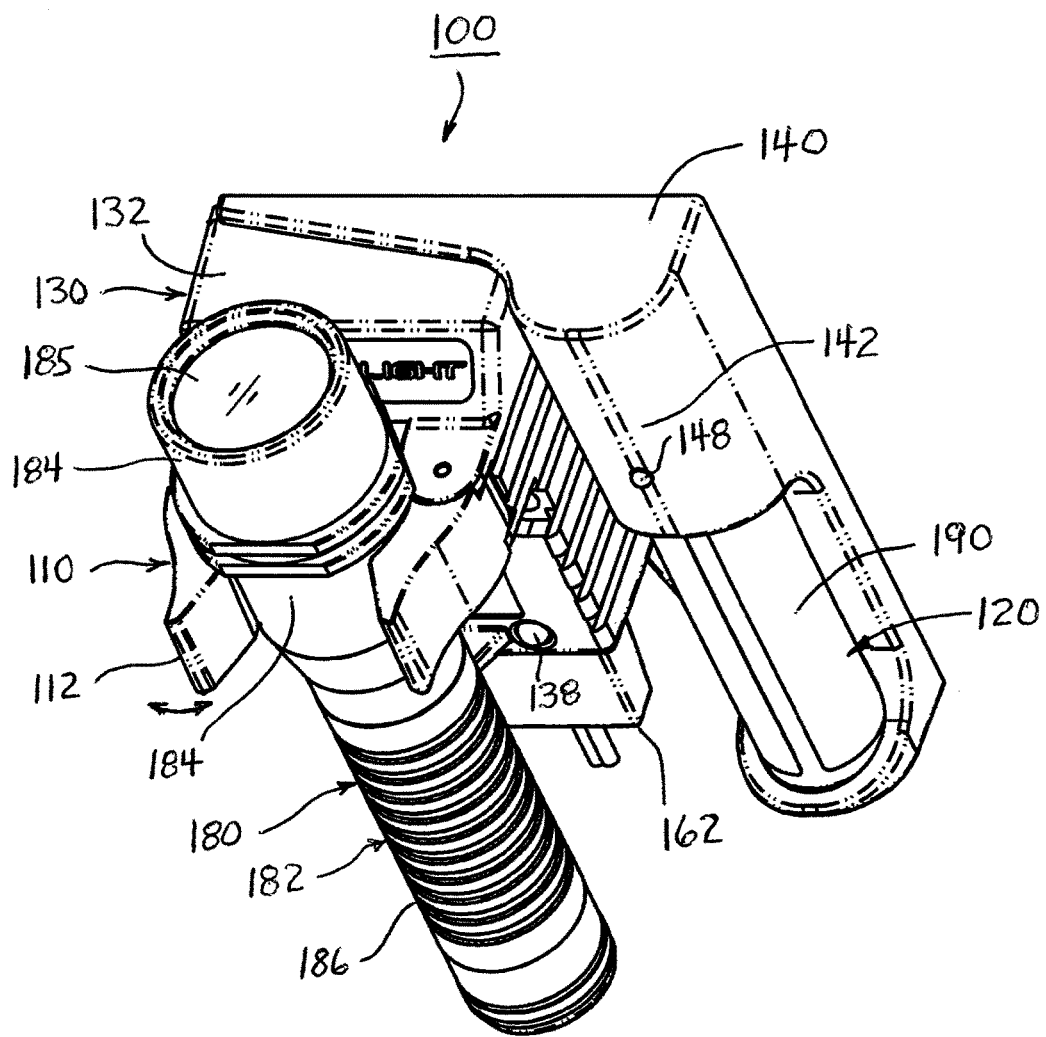
FIGS. 1A, 1B and 1C are three different perspective views of an example embodiment of a battery charger having a rechargeable electronic device and a rechargeable battery in respective cradles thereof.

In the Drawing, where an element or feature is shown in more than one drawing figure, the same alphanumeric designation may be used to designate such element or feature in each figure, and where a closely related or modified element is shown in a figure, the same alphanumerical designation primed or the like may be used to designate the modified element or feature. Similarly, similar elements or features may be designated by like alphanumeric designations in different figures of the Drawing. and with similar nomenclature in the specification. As is common, the various features of the drawing are not to scale, the dimensions of the various features may be arbitrarily expanded or reduced for clarity, and any value stated in any Figure is given by way of example only.

DESCRIPTION OF THE PREFERRED EMBODIMENT(S)

Figure 1B:
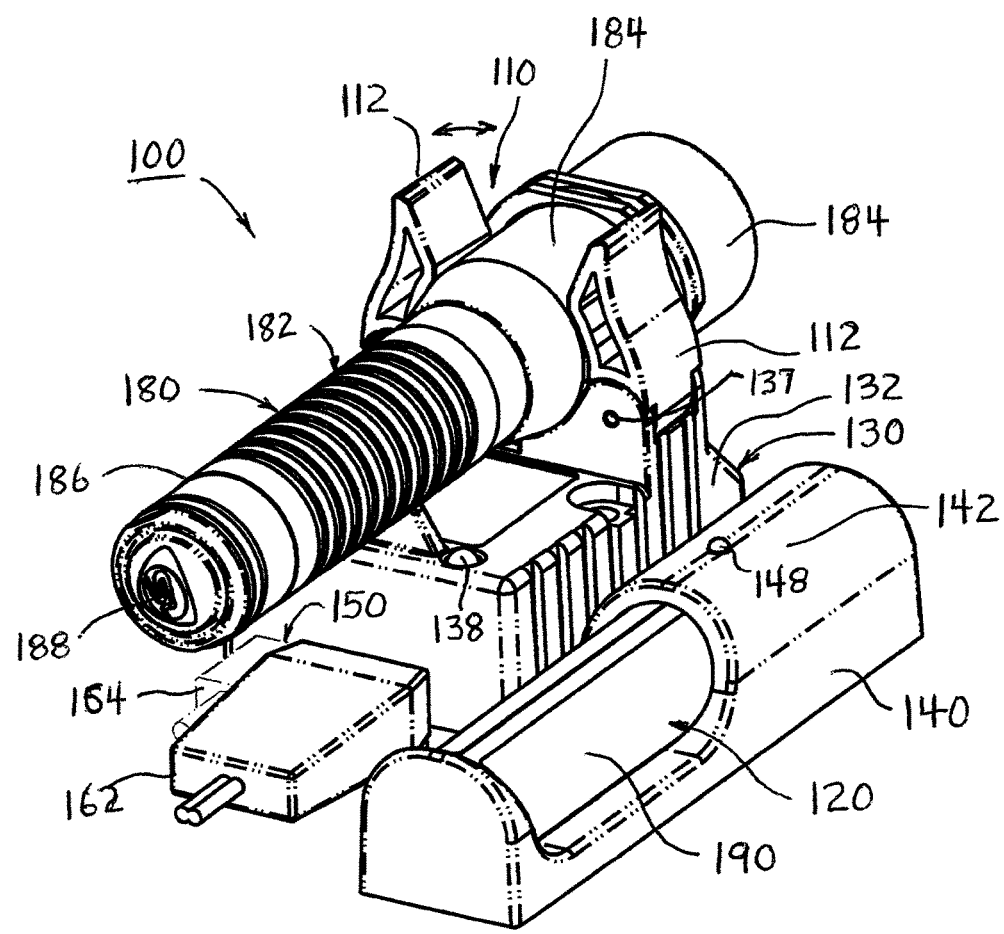
Figure 1C:
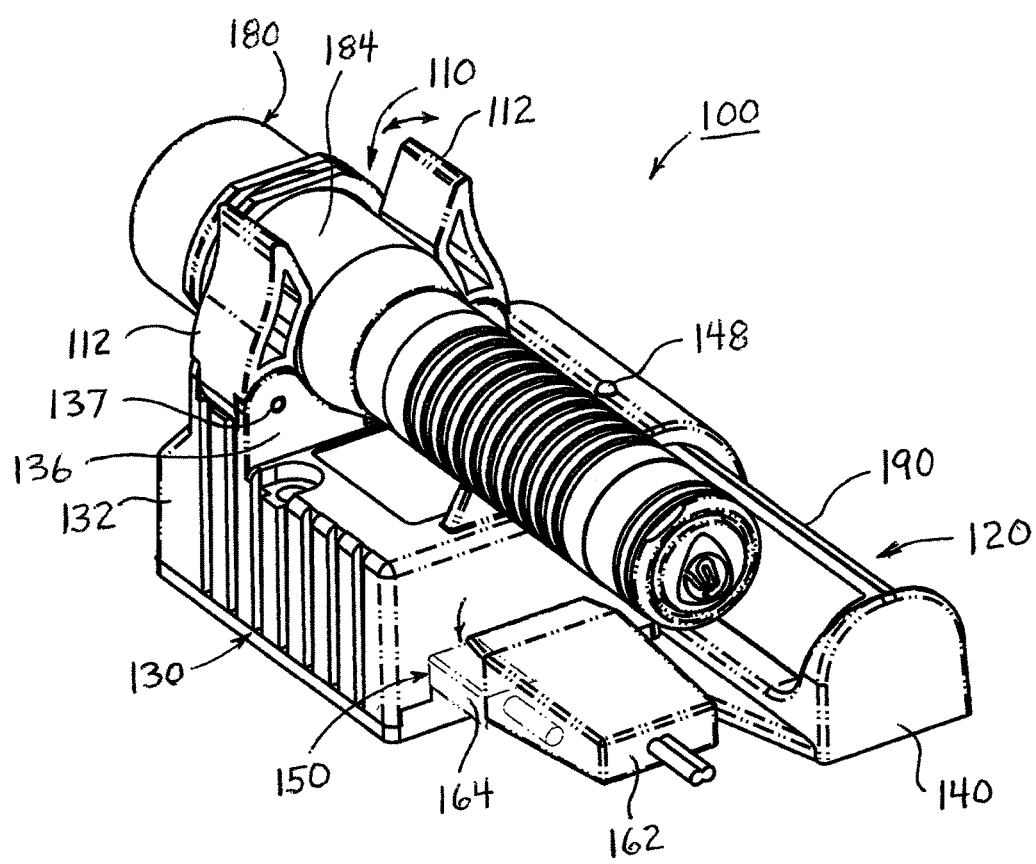
Figure 2A:
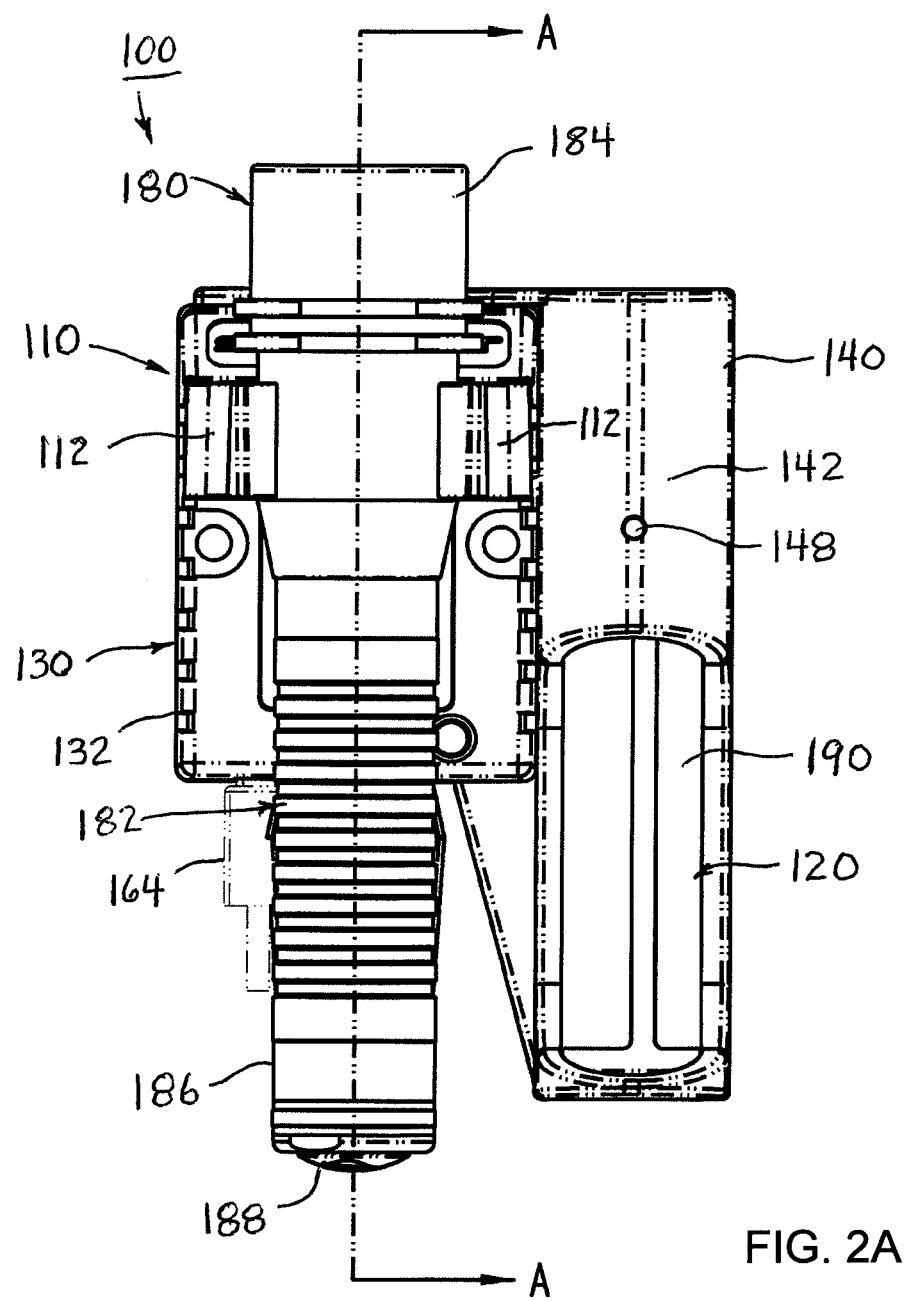
FIGS. 2A and 2B are front views of the example embodiment of a battery charger of FIG. 1 with and without the rechargeable electronic device light and the rechargeable battery in the respective cradles thereof.
Figure 2B:
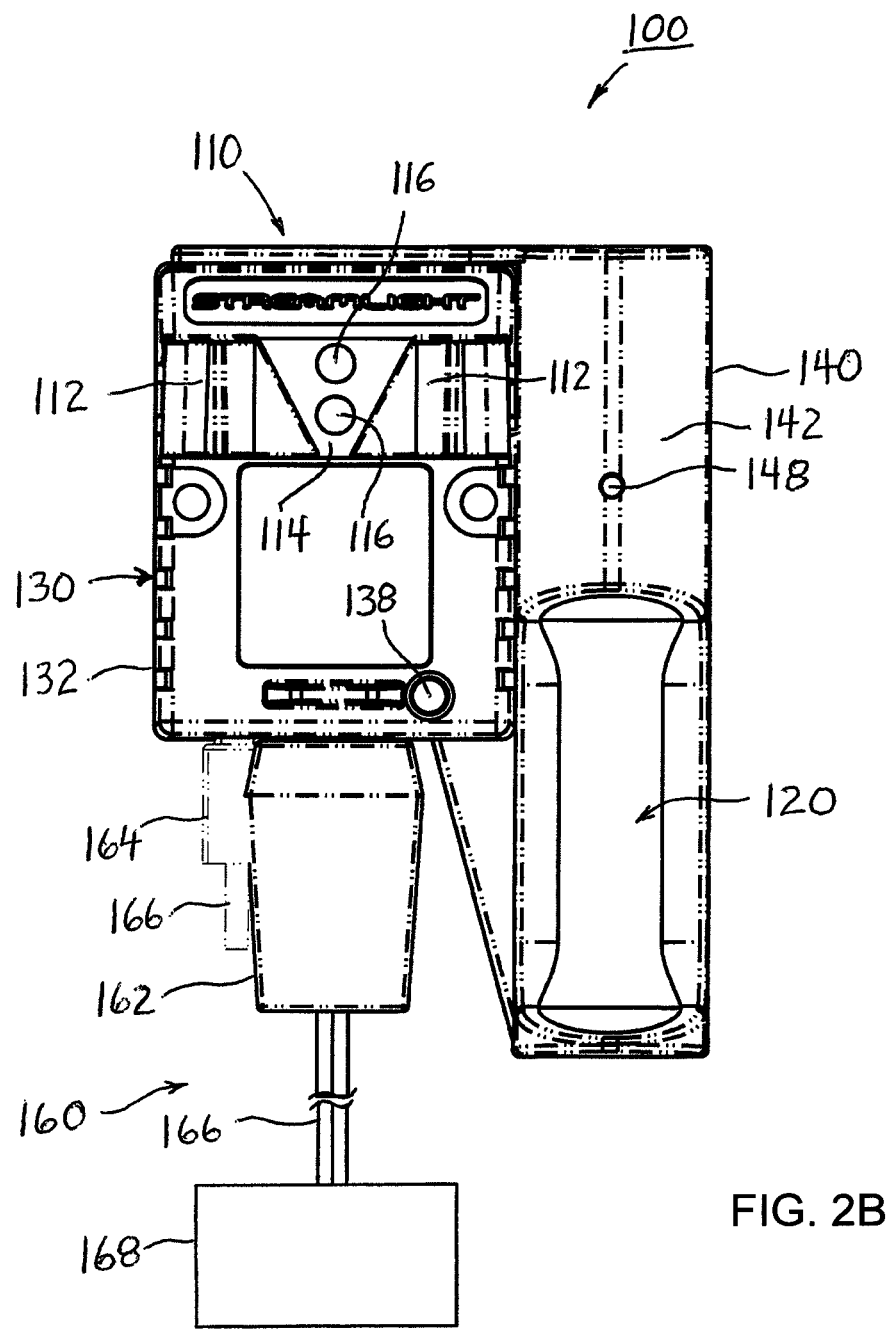
Figure 3:
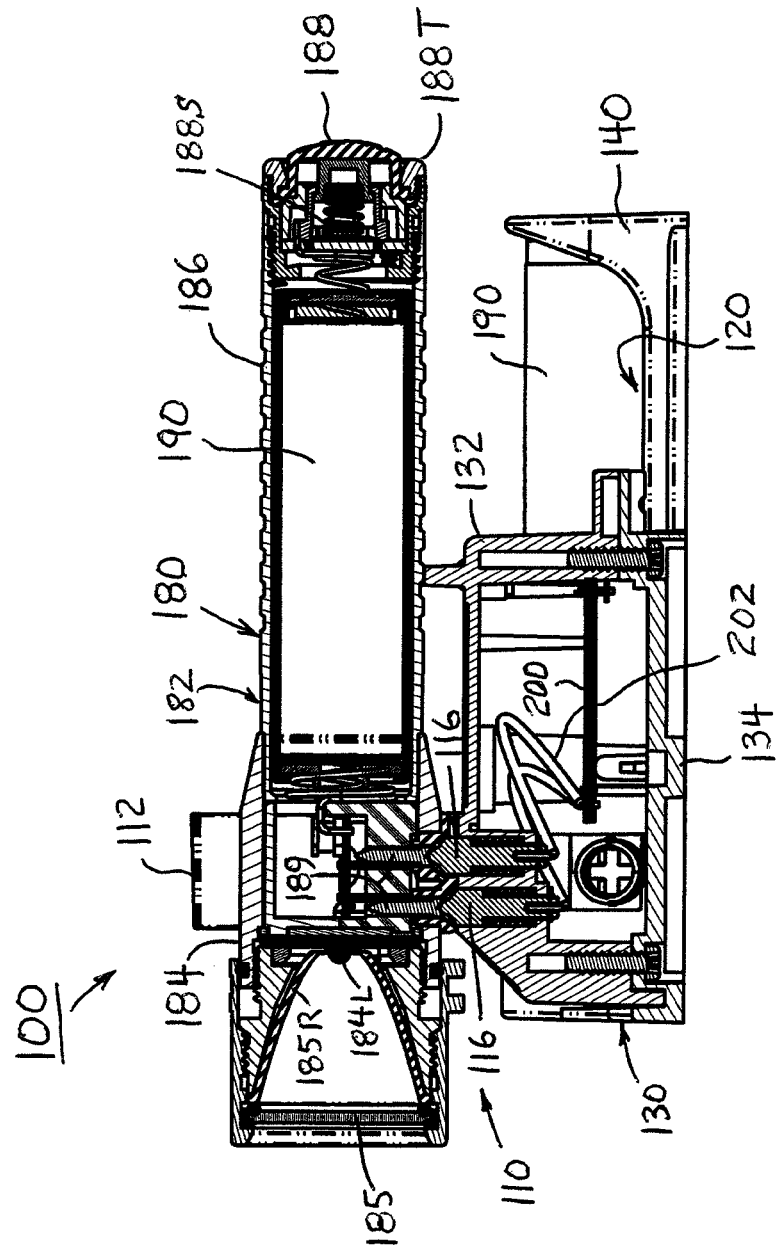
FIG. 3 is a side cross-sectional view of the example embodiment of a battery charger of FIGS. 1 and 2 with a rechargeable electronic device in one cradle thereof and a rechargeable battery in another cradle thereof.

FIGS. 1A, 1B and 1C are three different perspective views of an example embodiment of a battery charger 100 having a rechargeable electronic device 180 and a rechargeable battery 190 in respective cradles 110, 120 thereof; and FIGS. 2A and 2B are front views of the example embodiment of a battery charger 100 of FIG. 1 with and without the rechargeable electronic device 180, e.g., a flashlight 180, and the rechargeable battery 190 in the respective cradles 110, 120 thereof. FIG. 3 is a side cross-sectional view of the example embodiment of a battery charger 100 of FIGS. 1 and 2 with a rechargeable electronic device 180 in one cradle 110 thereof and a rechargeable battery 190 in another cradle 120 thereof.

The example embodiment 100 illustrated is a Streamlight STRION Piggyback Battery Charger 100 that has two receptacles 110, 120 or cradles 110, 120—one 110 for charging a battery or battery pack within a flashlight 180 that is placed into the receptacle 110 and a second 120 for charging a battery 190 or battery pack 190 apart from a flashlight 180, e.g., typically the battery packs 190 are of the same type with each being a replacement for the other. Charger 100 receives electrical power from either of two different electrical power supplies via connector port 150:

A 12/18/24 volt DC power source that connects, e.g., to a DC vehicle system or to another source that connects to AC power mains, and A USB power source, sometimes connected to a power "cube" or "block" that provides, e.g., +5 volts DC, or to a device, e.g., a personal computer, that provides, e.g., +5 VDC, at a USB port.

Charger 100 has a generally rectangular base 130 or housing 130 from which a pair of spring-biased arms 112 extend to define a first cradle 110 having electrical contacts 116. When placed into the first cradle 110, an electronic device, e.g., flashlight 180, is retained therein by the spring-biased arms 112 and electrically connects to the circuitry 200 of the charger 100 to receive charging current via corresponding electrical contacts 116. A second or auxiliary cradle 120 is defined, e.g., along one side of the rectangular housing 130 to receive a battery 190, e.g., a battery 190 or battery pack 190 apart from a flashlight, such as an auxiliary battery or a spare battery, which is retained therein to electrically connect to the circuitry 200 of the charger 100 to receive charging current via corresponding electrical contacts 116. The charger electrical circuitry 200 is contained and supported within the charger base 130.

First and second electrical receptacles 152, 154, e.g., electrical connectors 152, 154, are provided in a charger connector port 150, e.g., an opening 150 in the charger base 130, e.g., on the bottom side thereof, for receiving connectors of electrical cables from two or more different electrical power supplies. Preferably, one opening or port 150 in the charger base 130 provides access to plural electrical connectors 162, 164, e.g., two electrical connectors 152, 154, and the one opening 150 is configured so that the external outlines of the plural, e.g., two, different electrical power supply connectors 162, 164 cannot be connected to the charger base 130 at the same time. In other words, when either one of the plural, e.g., two, cable connectors 162, 164 is plugged into its corresponding connector 152, 154 in the port 150 of the charger base 130 it overlaps in part the other connector or connectors 152, 154 thereof so that the plugged in connector 162, 164 mechanically interferes with and prevents another cable connector 162, 164 from being plugged into its corresponding connector 152, 154 in the connector port 150.

An example of such connector opening or port 150 having first and second electrical receptacles 152, 154 for receiving at different times first and second electrical connectors 162, 164, e.g., an AC or DC power supply connector 162 and a USB connector 164, is described below in relation to FIGS. 4 and 5. Power source 160 typically includes one of electrical connectors 162, 164 that connect via a respective electrical cable 166 to a respective power source 168, which in the Figure represent any one of several external power sources 168, including a USB power source 168.

Charger housing or base 130 includes a housing body 132 having an opening on the underside thereof that is covered by a housing base 134. A pair of arm supports 136 extend from the face of charger housing body 132 and provide respective pivotable joints at which spring arms 112 are pivotably attached 137, e.g., by a pivot pin 137, to arm supports 136 of housing body 132. Spring arms 112 are biased by respective springs to pivot towards each other and have respective opposing sloped surfaces at the ends thereof distal the pivot pins 137 to facilitate flashlight 180 being placed into cradle 110 with a snap-in motion. That is, when flashlight 180 is pressed against the sloped surfaces of spring arms 112, spring arms 112 move away from each other against the spring bias to allow flashlight 180 to move into cradle 110 whereupon spring-biased arms 112 move closer to each other to retain flashlight 180 in cradle 110 (as illustrated by double-ended arrows). Thus, an electrical device 180 may conveniently be quickly snapped into cradle 110 and snapped out of cradle 110.

Preferably, flashlight 180 is guided to a predetermined position in cradle 110 whereat charging contacts of flashlight 180 make electrical connection to electrical charging contacts 116 within cradle 110. Cradle 110 preferably has a triangular guide member 114, e.g., a triangular recess 114, that corresponds to a corresponding triangular guide member, e.g., a triangular raised feature, of flashlight 180. When the corresponding guide members of cradle 110 and flashlight 180 engage each other, the electrical charging contacts 189 of flashlight 180 are in electrical contact with electrical charging contacts 116 of charger 100, as illustrated in FIGS. 2B and 3.

An optional auxiliary or "piggyback" secondary housing 140 may be attached to charger housing 130 in which position it is electrically connected to the circuitry of charger 100 for charging a rechargeable battery 190 which may be placed into cradle 120 of housing 140. Connection end 142 of housing 140 includes electrical contacts for making electrical connection to electrical contacts of rechargeable battery 190. An example of a suitable contact arrangement may be found in, e.g., U.S. Pat. No. 6,652,115 entitled "BATTERY CHARGER STRUCTURE AND RECHARGEABLE FLASHLIGHT SYSTEM USING THE SAME" issued Nov. 25, 2003, which is assigned to Streamlight, Inc., the assignee of the present Application, and which is hereby incorporated herein by reference in its entirety.

An indicator light 138, e.g., a light emitting diode (LED) 138, on charger housing 130 provides a visual indication of the status of the charging being provided via cradle 110 when an electronic device 180 is disposed therein. Similarly, an indicator light 148, e.g., a light emitting diode 148, on secondary charger housing 140 provides a visual indication of the status of the charging being provided via cradle 120 when a rechargeable battery 190 is disposed therein. Either or both of indicators 138, 148 may be a light emitting diode or may include an optical light pipe coupled to light emitting diodes within charger base 130 and secondary housing 140, respectively.

Example electronic device 180 may be a flashlight 180 having a device housing 182 with a light head 184 at a forward end thereof and a barrel 186 toward a rearward end thereof, with an actuator 188 at the rearward end thereof for controlling operation of flashlight 180. Light head 184 includes a light source, e.g., a light emitting diode 184L and a reflector 185R that forms the light from LED 184L into a desired beam shape which exits via lens 185. A rechargeable battery 190 may be disposed within barrel 186 and actuator 188 may actuate an electrical switch within flashlight housing 182 for controlling the operation of flashlight 180.

As illustrated in FIG. 3, housing base 134 is retained to the underside of housing body 132 by one or more threaded or other fasteners and an electronic circuit board 200 is disposed in housing 130. Charging contacts 116 are spring biased by respective springs, e.g., helical springs, surrounding the respective bases thereof so as to be urged outward toward the position in the first cradle 110 whereat the corresponding charging contacts 189 of flashlight 180 are positioned when flashlight 180 is seated in cradle 110. Contacts 116 are connected to the circuitry of circuit board 200 by respective electrical wires 202 for conducting charging current to electronic device 180, e.g., flashlight 180, via contacts 116 and for sensing the voltage of the battery 190 therein, as described below. Piggyback or secondary charger housing 140 may attach to charger housing 130 by its base serving in place of the base 134 of housing 140 and being fastened thereto by one or more fasteners, e.g., self-tapping screws. Secondary charger housing 140 may connect electrically by plural electrical conductors, e.g., wires, connected between an electronic circuit board mounted in secondary housing 140 and the electronic circuit board 200 mounted in housing 130.

Device 180 is seen to have two coaxial helical springs extending rearward from the forward or light head 184 end thereof for making electrical connection to a central contact and to a surrounding annular contact at the forward end of battery 190. Actuator 188 is seen to have a central region that actuates a switch 188S via a spring and plunger that are contained within the tail cap 186T that is on the end of barrel 186 of housing 182 of flashlight 180. Switch 188S may be connected by barrel 186 providing one electrical conductor and by battery 190 providing a second electrical conductor via a spring of switch 188S and an electrical contact at the rearward end of battery 190.

Figure 4A:
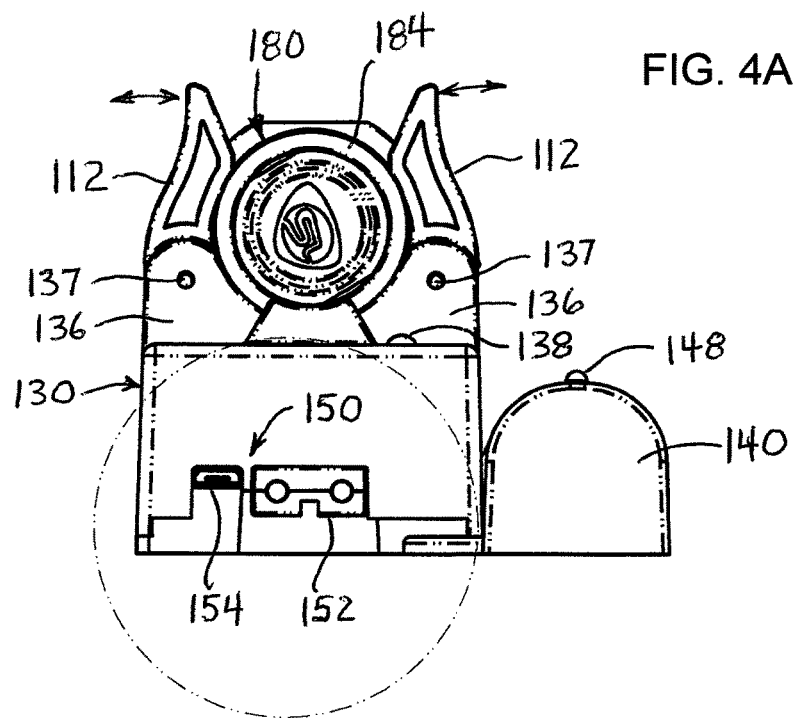
FIG. 4A is a view of the bottom end of example embodiment of the battery charger of FIGS. 1-3 and FIG. 4B which is an enlargement of a portion of FIG. 4A showing a connector port thereof.
Figure 4B:
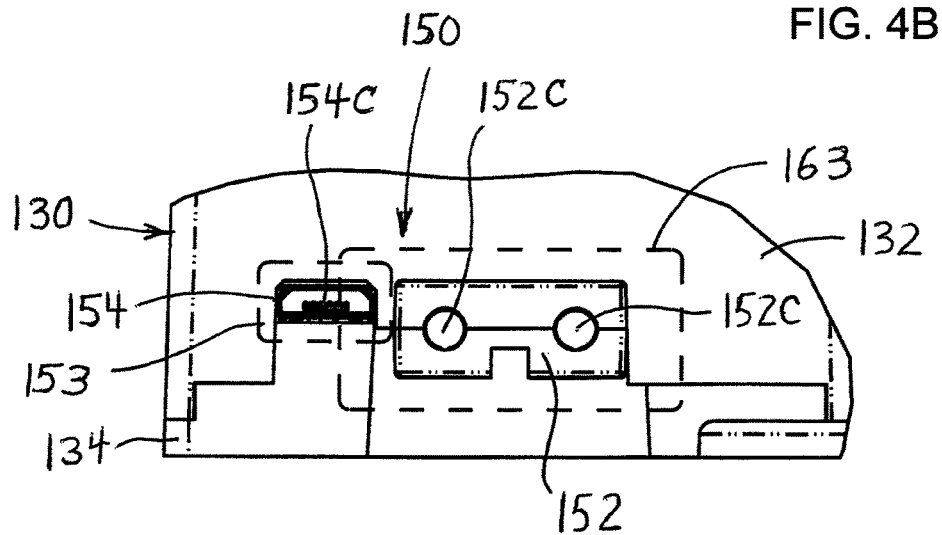
Figure 5A:
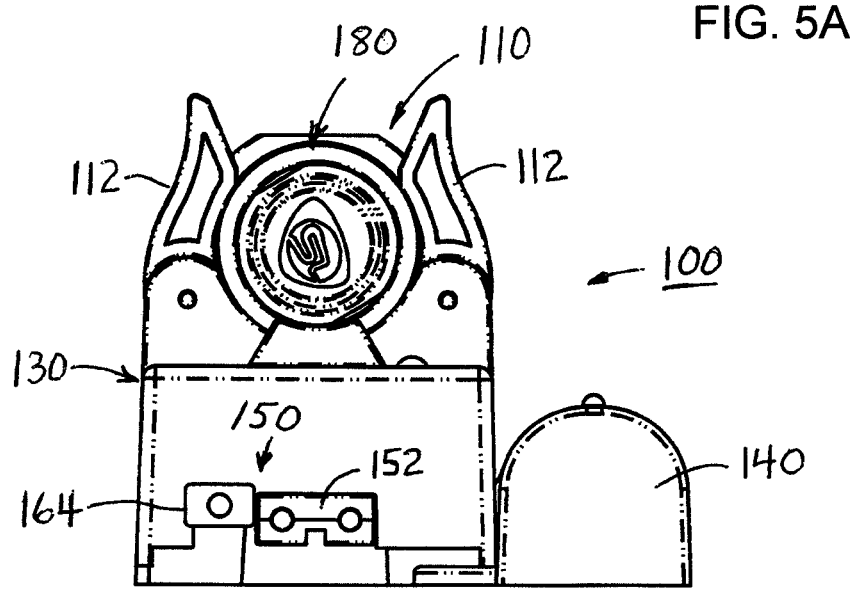
FIGS. 5A and 5B are respective views of the connector port on the bottom end of the example embodiment of a battery charger with each of two different plug connectors inserted therein.
Figure 5B:
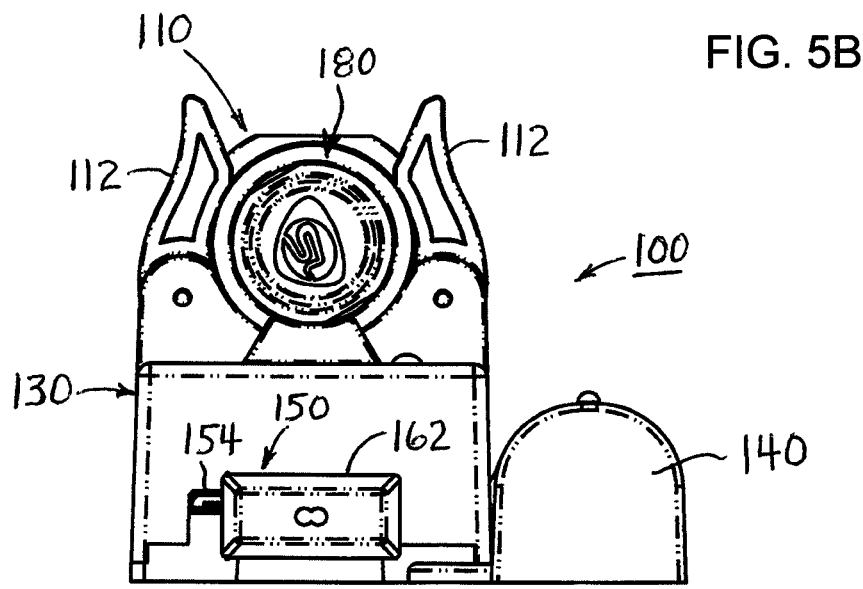

FIG. 4A is a view of the bottom end of example embodiment of a battery charger 100 of FIGS. 1-3 and FIG. 4B is an enlargement of a portion of FIG. 4A showing a connector port 150 thereof; and FIGS. 5A and 5B are respective views of the connector port 150 on the bottom end of the example embodiment of a battery charger 100 with each of two different plug connectors 162, 164 inserted therein.

Connector 152 is, e.g., a connector having two receptacle contacts 152C for receiving a two prong plug 162 associated with a DC power source, e.g., such as ones available from Streamlight, Inc., located in Eagleville, Pa., that provide a DC voltage in the range of about 10 to 24 VDC. These connectors 152, 162 are keyed by a rectangular recess on connector 152 that corresponds with a rectangular projection of connector 162 so that the two connectors 152, 162 can mate in only one orientation so as to provide proper polarity DC voltage to charger 100, e.g., to circuit board 200 thereof. Preferably a shroud or frame surrounds the contacts of connectors 152, 154 so as to reduce the likelihood of their inadvertently coming in to electrical contact with other than the recessed receptacle contacts 152C of connector 152.

Connector 154 is, e.g., a USB connector, having four contacts 154C for receiving a USB plug 164 associated with a USB DC power source, e.g., such as ones available from Streamlight, Inc., of Eagleville, Pa., as well as from many other sources. USB power sources provide a DC voltage of about 5.0 VDC on two of the connections and can provide signals and/or data on the remaining connections. These connectors 154, 164 are keyed by a shaped rectangular frame on connector 154 that corresponds with a shaped rectangular frame of connector 164 so that the connectors 154, 164 can mate in only one orientation so as to provide proper polarity DC voltage to charger 100, e.g., to circuit board 200 thereof. The respective frames surround the contacts of connectors 154, 164 so as to reduce the likelihood of their inadvertently coming in to electrical contact other than with the mating contacts of another USB connector 154, 164. Typically, connector 154 is a female USB connector and connector 164 is a male USB connector.

Connector port 150 is shaped so that the respective shells of connectors 162, 164 physically block the other connector 164, 162 from being connected to connector port when one of connectors 162, 164 is connected thereto. Connector 162 has a shell whose outline 163 is indicated by a dashed rectangle surrounding connector 152 and connector 164 has a shell whose outline 165 is indicated by a dashed rectangle surrounding connector 154 to illustrate that the respective shells 163, 165 physically interfere to prevent both being connected to charger 100 at the same time. Specifically, the shell 163 of connector 162 blocks the shell 165 of connector 164 and so prevents connector 164 from being mated with connector 154, and the shell 165 of connector 164 blocks the shell 163 of connector 162 and so prevents connector 162 from being mated with connector 152.

Figure 6A:
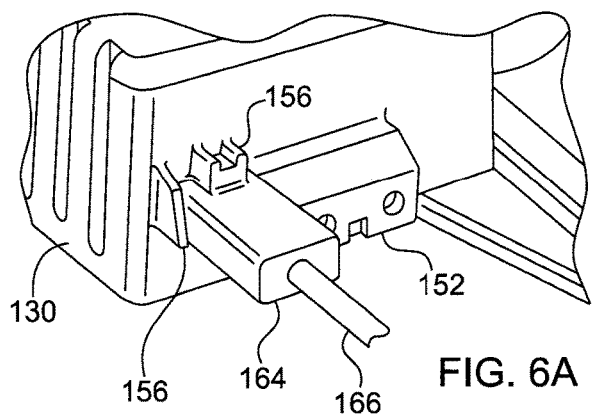
FIGS. 6A, 6B and 6C are a perspective view and two different side views, respectively, of the connector port on the bottom end of the example embodiment of a battery charger including an example embodiment of a connector alignment arrangement.
Figure 6B:
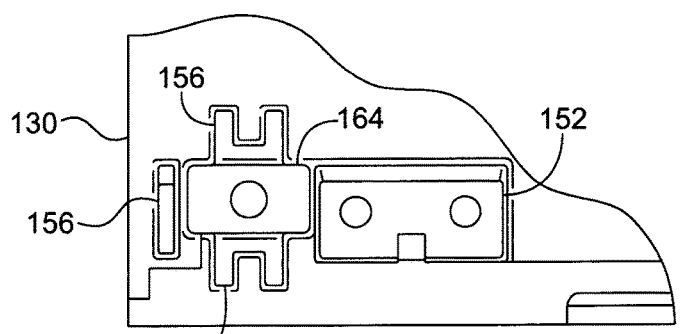
Figure 6C:
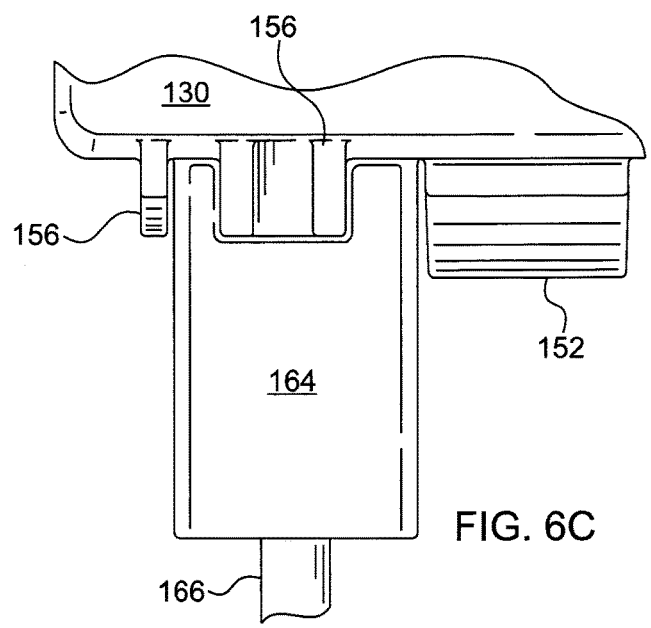

FIGS. 6A, 6B and 6C are a perspective view and two different side views, respectively, of the connector port 150 on the bottom end of the example embodiment of a battery charger 100 including an example embodiment of a connector alignment arrangement 156. USB connector 164 is illustrated as being plugged in to USB connector 154 of connector port 150. Many USB connectors can easily be attempted to be connected with the USB plug 164 when misaligned from the USB receptacle 154 which can damage either or both connectors. Alignment arrangement 156 includes a plurality of guides 156 that extend outwardly from housing 130 around USB connector 154 to define a guide path to decrease any misalignment of USB plug 164 before it comes into mating position with USB connector 154, thereby to reduce the risk of damage.

The plurality of guides 156 provided extend outwardly from housing 130, e.g., substantially perpendicularly to the surface of housing 130 around USB connector 154 so as to be adjacent to USB plug 164 when USB plug 164 is plugged into USB connector 154 or is being plugged into connector 154. Guides 156 preferably are spaced apart a distance that is slightly greater than the transverse dimensions of connector 164 so that the body of connector 164 is constrained by the spacing between guides 156 to be substantially aligned with connector 154 as the two are moved closer together for mating.

In the illustrated example arrangement, e.g., three guides 156 are provided, one guide 156 adjacent a narrow side of connectors 152, 164 and two opposing guides 156 adjacent the two wider sides of connector 154, 164. The latter two guides may be, and preferably are, U-shaped when viewed on end, e.g., for increasing their resistance to breakage. The function of a guide 156 at the other narrow side of connector 152, 164 in this example embodiment is provided by the body of connector 152 which extends outwardly form housing 130, however, it could be provided by another guide 156.

Figure 7D:
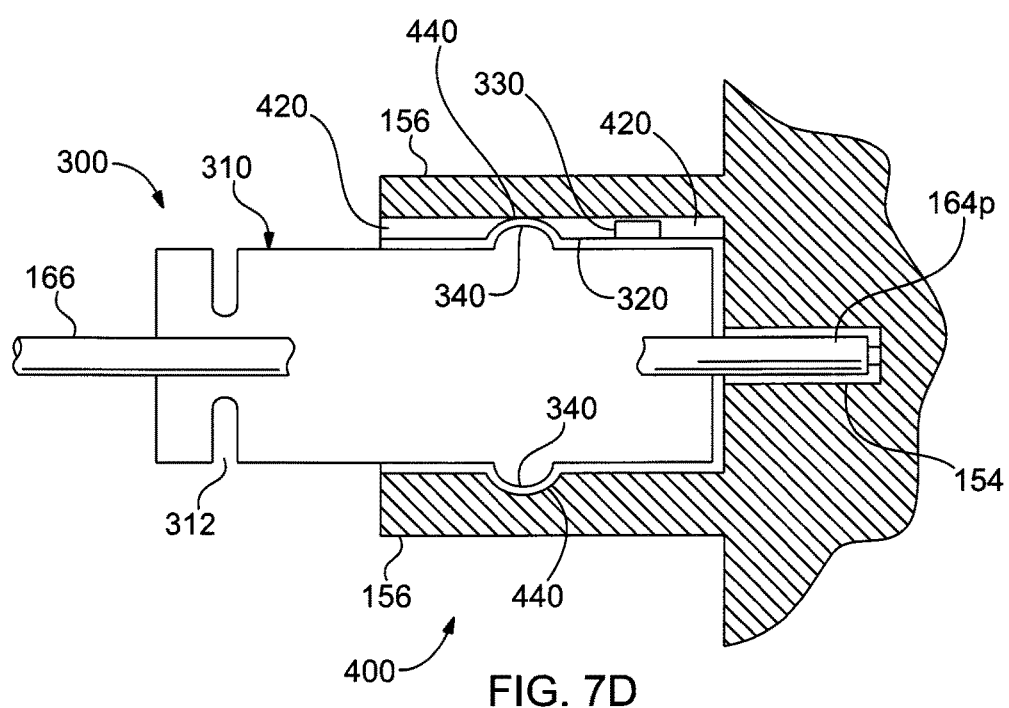
FIG. 7D is a cross-sectional view of the example connector in a mated configuration.
Figure 8:
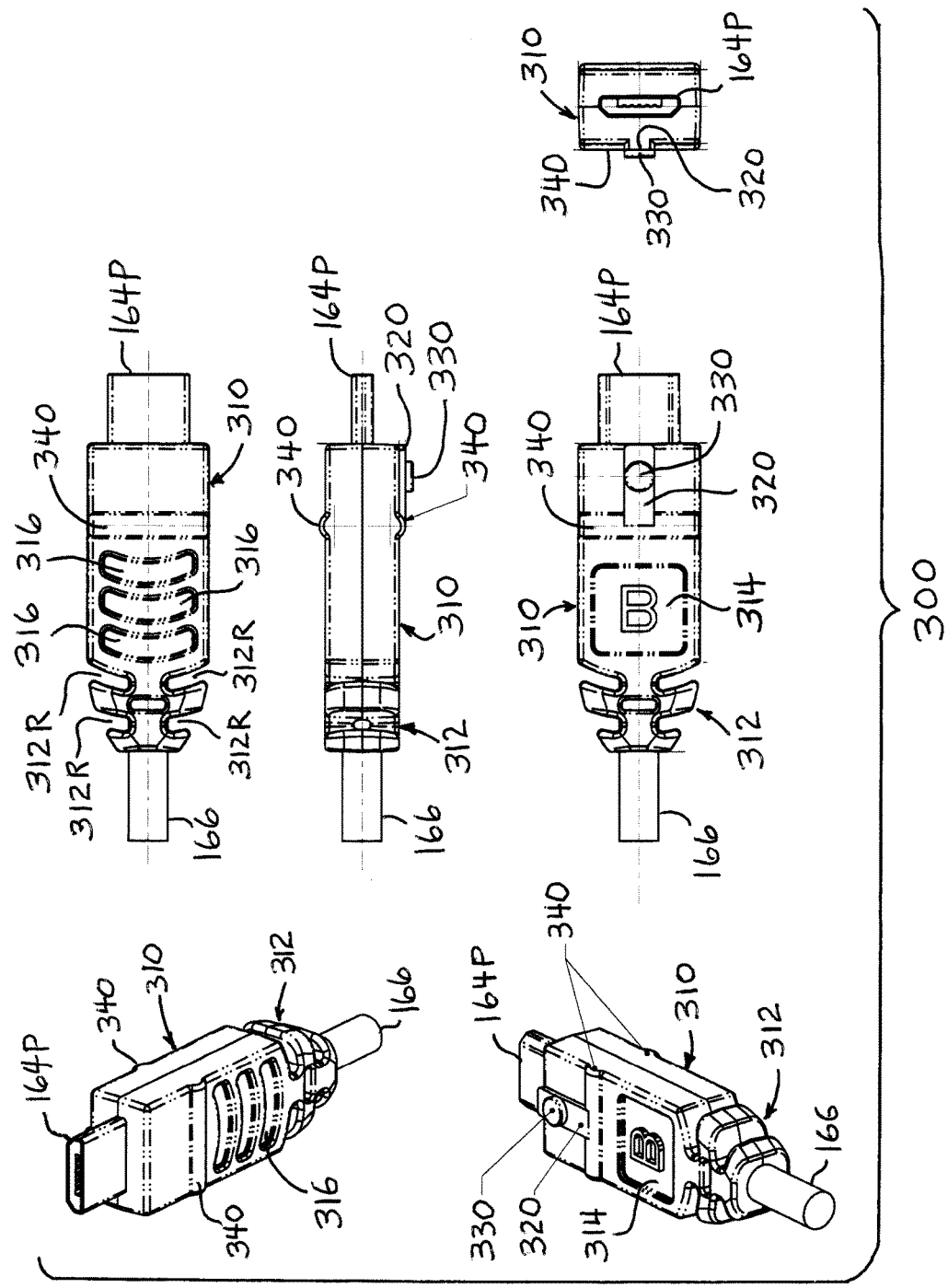
FIG. 8 includes two perspective views and four orthogonal views of the example embodiment of alternative connector of FIG. 7 including an example embodiment of an alignment and retaining arrangement.

FIGS. 7A, 7B and 7C are respective perspective views of an example embodiment of an alternative connector 164, 300 and of the alternative connector 164, 300 partially inserted and fully inserted in the connector port 150, 156 of the example embodiment of a battery charger 100 including an example embodiment of an alignment and retaining arrangement 156, and FIG. 7D is a cross-sectional view of the example connector 300 in a mated configuration; and FIG. 8 includes two perspective views and four orthogonal views of the example embodiment of an alternative connector 164, 300 of FIG. 7 including an example embodiment of an alignment and retaining arrangement 156.

Connector 164, 300 includes a connector body 310 that is, e.g., molded over the electrical elements of a connector, e.g., a USB connector frame 164P, to which is connected an electrical cable 166 over which body 310 is preferably also over-molded. The rear end of body 310, i.e. the end distal connector frame 164P, tapers narrower and has a plurality of recesses 312 for reducing the strain between cable 166 and body 310 where cable 166 enters body 310. Strain relief 312 reduces the strain and thus renders the exterior surface of cable 166 less likely to separate from the molded material of body 310. Connector body 310 preferably also has one or more gripping features 314, 316, e.g., ridges, bumps and/or recesses 314, 316, on opposing faces thereof to facilitate insertion and removal of connector 300 from its mating connector.

The forward end of connector body 310, i.e. the end proximal connector frame 164P, preferably has one or more features 320, 330, 340 for facilitating the alignment of connector 300 for insertion into its mating connector, e.g., a connector 154. In particular, features 320, 330, 340 cooperate with guides 156, 400 and corresponding features thereof to require the substantial alignment of connector 300 for insertion into its mating connector, e.g., a connector 154, of base 130B to prevent connector frame 164P from entering its mating connector, e.g., a connector 154, if in reversed orientation, and to retain connector 300 in position with connector frame 164P mated with its mating connector, e.g., a connector 154.

Accordingly, connector 300 preferably has at least one alignment feature 320, e.g., an alignment rib 320, and guides 156, 400 preferably have at least one corresponding alignment feature 420, e.g., an alignment groove 420, for substantially aligning the respective longitudinal axes of connector 300 and its mating connector, e.g., a connector 154, at least in one axis, for proper mating.

Connector 300 preferably includes at least one raised guide 330 for allowing connector 300 to enter guides 400, which includes opposing guides 156 which extend from base 130B and are spaced apart by a distance that is slightly greater than the dimension of connector body 310, but less than the combined dimension of connector body 310 and raised guide 330 thereon, only if in the proper orientation wherein raised guide 330 becomes disposed in alignment groove 420 upon mating and so cannot be inserted in an inverted orientation.

Connector 300 preferably also includes one or more retaining features 340, e.g., transverse retaining ribs 340, complementary to one or more corresponding retaining features, e.g., transverse retaining grooves 440, of guides 156, 400 so that retaining ribs 340 become disposed in retaining grooves 440 when connector 300 is fully mated with its mating connector, for retaining connector 300 in mating connection with its mating connector, e.g., a connector 154. One or more retaining features 340 may be provided on one or more surfaces of connector body 310, and alternatively, the ribs 340 could be provided on guides 400 and the grooves 440 could be provided on connector 300.

Guides or guide members 156, 400 of this example embodiment are preferably "C-shaped" when viewed from the end. Guides 156, 400 provide two opposing broad inward facing surfaces that are adjacent to and guide the two opposing broad outer surfaces of connector body 310 and are of sufficient thickness to provide strength and to provide groove 420 and recesses 440 on at least one of the inward facing surfaces thereof. The remote ends of the C-shaped guides 156, 400 bend around and are adjacent to the two opposing narrow sides of connector body 310 and guide the two opposing narrow sides of connector body 310 during mating and de-mating of connector 164, 300 and, e.g., its mating connector 154.

In one example embodiment of a connector 300, the over-molded plug housing 310 including raised guide 330 and alignment rib 320 is a slip-fit into guide 400 with the engagement of retaining rib 340 and retaining groove 440 being more of an interference or snap-fit with guide 400. The slip-fit tolerance is selected to be close enough to guide the connector 300 and prevent accidental damage thereto while allowing proper insertion depth for the proper mating of connectors 164, 154. The position of the retaining rib or ribs 340 relative to retaining grooves 440 determines the insertion depth for a given connector types, and will be different for different connector types, and so the dimensions and tolerances selected must relate to or comply with the particular connector and/or connector standard chosen for the application.

For example: where the charger 100 employs a Micro-B type USB connector configuration, connector body 310 and guide 400 will be configured and sized to be compatible with the published Micro-USB cable and connector standards. In the illustrated example embodiment, connector 300 is a Micro-B USB connector and an optional raised letter "B" representative thereof may be provided on connector body 310, e.g., in recess 314 thereof where it provides further indication of the orientation of connector body 310. The present arrangement is configurable to be compatible with mini-USB and micro-USB connectors, type A and type B USB connectors, and with USB 1.x, 2.x and 3.x standards, as well as with other non-USB connectors, of both standard and proprietary types, and the term "USB" is intended to include any and all of the foregoing USB connector types, as well as future USB connector types.

Figure 9:
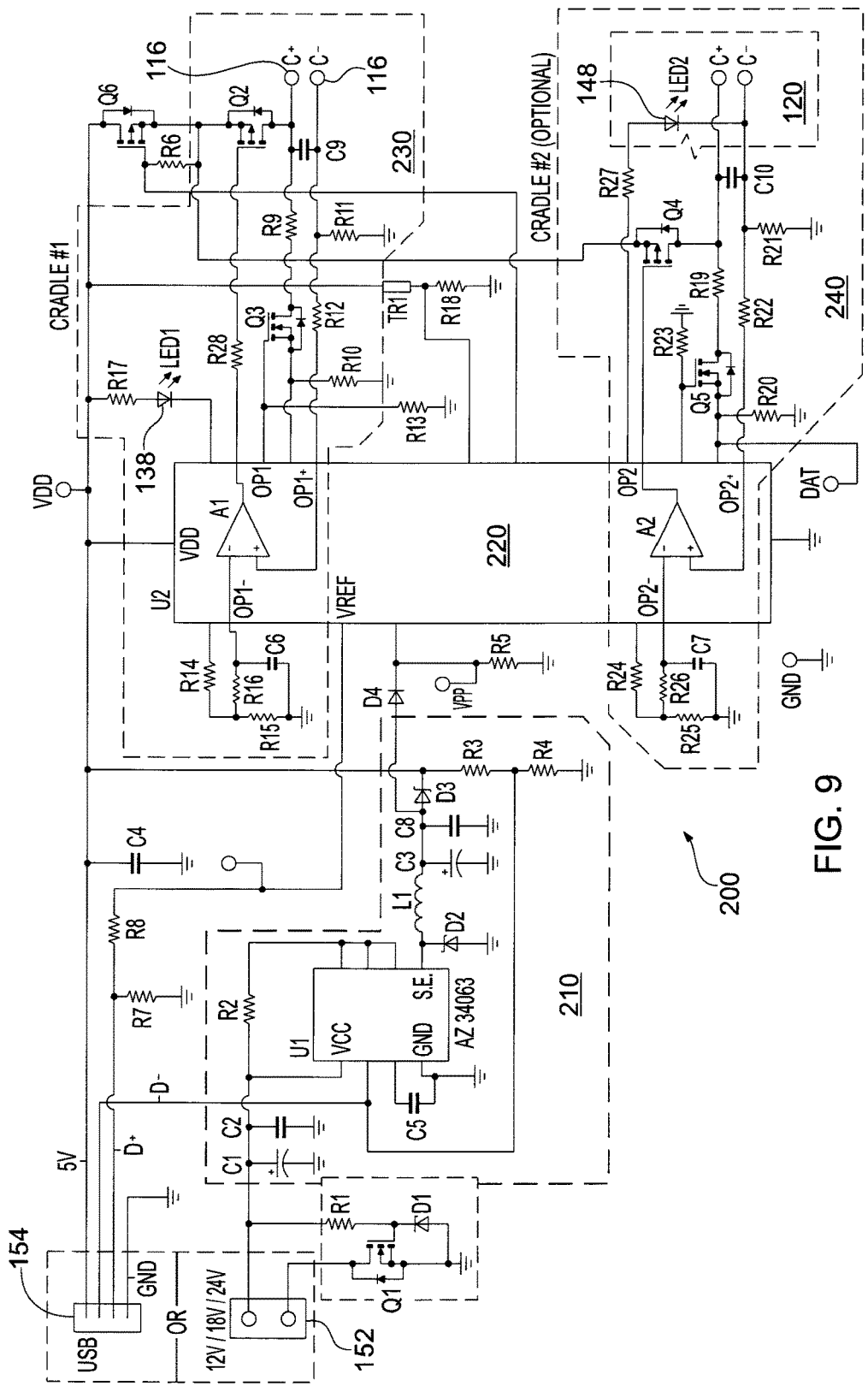
FIG. 9 is an electrical schematic diagram of an example embodiment of an electrical circuit suitable for use with the example embodiment of a battery charger of FIGS. 1-6C.

FIG. 9 is an electrical schematic diagram of an example embodiment of an electrical circuit 200 suitable for use with the example embodiment of a battery charger 100 of FIGS. 1-8, and FIG. 9A is an alternative example embodiment of the example electrical circuit of FIG. 9. Therein, charger input connectors 152, 154 for receiving electrical power from either of the two power supplies 168 are shown at the upper left and the two pairs of output charging contacts, identified as C+ and C− to indicate DC polarity, for providing electrical charging power to the two receptacles or cradles 110, 120 are shown at the far right.

A DC converter 210 including regulator integrated circuit U1 and its associated components shown in the left half of the schematic diagram provide, e.g., a buck PWM (pulse width modulated) voltage regulator that converts the input voltage at connector 152 from the 12/18/24 VDC voltage of power supply 168 (identified as VDD) down to about 5.1 VDC (nominally 5.12 VDC) at the cathode of D3, also designated as VDD, which powers the battery charging via output charging contacts C+ and C− when the 12/18/24 VDC power supply 168 is connected via connectors 152, 162 and is electrically powered.

The +5 VDC provided via the USB connection 154 is directly connected as VDD to power the battery charging via output charging contacts C+ and C− when the charging power from power supply 168 is provided via the USB connectors 154, 164. Because mechanical interference between connectors 162 and 164 prevents both of connectors 162 and 164 from being mated to charger port 150 at the same time, thereby to prevent electrical power from being applied via both power supply input connectors 152, 154 at the same time, no diode or other isolation thereof is needed to prevent a connection being made between two external power supplies 168 through the circuitry of charger 100.

Microprocessor or microcontroller 220, U2 controls operation of the charging circuitry 200 of charger 100. The type of power supply 168 that is connected 152, 154 is detected by microprocessor U2 and predetermined maximum current levels that can be drawn from that type of power supply 168 are then set accordingly. In the case of a USB power supply 168, signals on pins D– and D+ may be utilized to indicate the type of USB power supply, e.g., a USB "cube," and the maximum current that will be drawn therefrom may be set accordingly to a predetermined level.

In the event that the +5 VDC voltage supplied by the USB power supply 168 were to be below a predetermined minimum voltage, e.g., about 4.52 volts (nominal value), the maximum current that will be drawn by charger 100 may be and preferably is reduced by microprocessor 220, U2 in increments of current until the number of increments of reduced current is sufficient to reduce the maximum current drawn to a sufficiently lower current so that the voltage supplied by the USB-power source 168 increases to a level greater than the predetermined minimum voltage, e.g., greater than about 4.52 volts, but not to reduce the current below what is needed to provide some charging for a flashlight 180 and/or battery 190, e.g., about 50 milliamperes. Preferably this feature operates based only on the measured voltage received from a USB power source 168 independently of the power rating and power dissipation of the USB power supply 168 which is need not be measured nor calculated, and preferably is not measured nor calculated.

Two independent linear charge current regulators 230, 240 are provided respectively by FET transistors Q2 and Q4 under control of microprocessor 220, U2 for providing respective predetermined constant charging currents to a flashlight 180 in the first receptacle 110 and/or to a battery 190 in the second receptacle 120, i.e. at their respective charging contacts C+ and C–. Charging current may be supplied to both sets of output charging contacts C+ and C– simultaneously or to one set of output charging contacts C+ and C– when only a flashlight 180 or a battery 190 is present in its respective receptacle 110, 120 or when the charging current to one set of charging contacts is reduced, e.g., to zero, when the battery 190 (in flashlight 180 in cradle 110 or a battery 190 in cradle 120) connected thereto is fully charged.

In each instance, the magnitude of the charging currents provided at the respective output charging contacts C+ and C– is determined and controlled by operation of microprocessor or microcontroller U2, 220 and its associated components shown in the right half of circuit 200 in the schematic diagram. FET Q6 may prevent discharge of a flashlight battery 190 in the first cradle 110 and of a separate battery 190 in the second cradle 120 from discharging into the charger circuitry 200 when input power from a power supply 168 is not present, e.g., when the power supply 168 is disconnected. FETs Q2 and Q4 serve to prevent overcharge of the battery in the corresponding cradle 110, 120 due to conduction by the inherent body diode of a FET.

A primary charge control circuit 230 for the primary cradle 110 includes resistor R11 for sensing the charging current flowing via Q2 and (upper) charging contacts C+ and C– (e.g., contacts 116, all at the upper right of the diagram) into a battery 190 in a flashlight 180 connected between those charging contacts C+ and C–, 116, wherein feedback from current sensing resistor R11 is applied to the non-inverting (+) input of an operational amplifier (e.g., upper triangular symbol) of microprocessor U2, 220, thereby to linearly control transistor Q2. If the feedback signal from resistor R11 exceeds the reference signal, then the conduction of FET Q2 is reduced to reduce the charging current and if the feedback signal is less than the reference signal, then the conduction of FET Q2 is increased to increase the charging current, thereby to supply a substantially constant current to battery 190.

The voltage of a battery 190 in a flashlight 180, e.g., the open circuit voltage thereof, connected between those (upper) charging contacts C+ and C– (116) is measured by microprocessor U2 via a resistor divider R9 and R10 when transistor Q3 is turned on.

The predetermined value of substantially constant charging current is controlled by controlling the "reference" level which is applied to the inverting (–) input of the upper operational amplifier via a low pass filter network including resistors R14, R15 and R16 and capacitor C6. The output from microprocessor U2, 220 to the lowpass filter may be an analog signal or a digital signal, e.g., a PWM signal, and the output of the low-pass filter provides a filtered analog reference signal to the inverting (–) input of the upper operational amplifier of microprocessor U2, 220 to control the magnitude of the battery charging current provided to primary cradle 110.

A secondary charge control circuit 240 for the secondary cradle 120 includes resistor R21 for sensing the charging current flowing via Q4 and (lower) charging contacts C+ and C– (all at the lower right of the diagram) into a battery 190 connected between those charging contacts C+ and C–, wherein feedback from current sensing resistor R21 is applied to the non-inverting (+) input of an operational amplifier (e.g., lower triangular symbol) of microprocessor U2, 220 thereby to linearly control transistor Q4. If the feedback signal from resistor R21 exceeds the reference signal, then the conduction of FET Q4 is reduced to reduce the charging current and if the feedback signal is less than the reference signal, then the conduction of FET Q4 is increased to increase the charging current, thereby to supply a substantially constant current to battery 190. The secondary or "piggyback" charger 120 and its circuitry 240 are an optional feature of charger 100, and are configured to be added to and removed from housing 130 of charger 100.

The voltage of a battery 190 connected between those (lower) charging contacts C+ and C– is measured by microprocessor U2, 220 via resistor divider R19 and R20, when transistor Q5 is turned on.

The predetermined value of charging current is controlled by controlling the "reference" level which is applied to the inverting (–) input of the lower operational amplifier via low pass filter network including resistors R24, R25 and R26 and capacitor C7. The output from microprocessor U2, 220 to the lowpass filter may be an analog signal or a digital signal, e.g., a PWM signal, and the output of the low-pass filter provides a filtered analog reference signal to the inverting (–) input of the lower operational amplifier of microprocessor U2, 220 to control the magnitude of the battery charging current provided to cradle 120.

Each of the primary and secondary charging circuits 230, 240 operates in the same manner, however, each provides a level of charging current to a battery in cradle 110 and 120, respectively, that is determined independently of the other based upon the terminal voltage, e.g., an open-circuit terminal voltage, of the particular battery 190 it is charging. The charging current may be reduced from those levels if the current available from the external power supply 168 is insufficient to charge both batteries 190 in both cradles 110, 120 at their respective predetermined substantially constant current levels at the same time.

Because during charging there is a significant voltage difference between the voltage at charging contacts C+ and C– and the terminal voltage of the battery (cells) 190 of the flashlight 180 or of battery pack 190 being charged, e.g., due to contact resistance (e.g., between contacts 116 and 189) and wiring resistance and/or due to series elements within the flashlight 180 or battery pack 190, e.g., a diode in parallel with a resistor, the battery terminal voltage cannot be measured with sufficient accuracy at charging contacts C+ and C− when the battery 190 is being charged. Therefore, charging is interrupted periodically (e.g., charge current is essentially zero) so that the battery 190 open circuit voltage may be measured.

Each charging circuit 230, 240 operates on a predetermined repeating cycle wherein charging current is provided for a very large portion of the cycle, and is interrupted for a much shorter time during which the open circuit voltage of battery 190 is measured and a predetermined level of charging current, e.g., a substantially constant charging current, is set for the next period of charging based upon the measured open circuit battery voltage. In one example embodiment in which each cycle of charging is about 2.10 seconds in duration, charging is interrupted for about 25 milliseconds, e.g., about 1% of the cycle, during which the open circuit voltage of the battery is measured followed by an about 2.07 second charging time, e.g., about 99% of the cycle, at the current determined by the open circuit voltage measured immediately prior thereto. The cycling of the respective charging circuit cycles of circuits 230, 240 for electronic device cradle 110 and battery cradle 120 could be concurrent, i.e. in unison, or their respective repeating cycles could be offset from each other in time, e.g., by about half the cycle time, e.g., by about 1.05 seconds in the example cycle.

An example of typical values of battery open circuit voltage $V_{OC}$ and corresponding typical charging current levels for an example Lithium-Ion battery is presented in Table I following:

TABLE I

BATTERY CHARGE CURRENT & BATTERY VOLTAGE (4)

| If Battery $V_{OC}$ Is: | Then $I_{CHARGE}$ Should be: | Notes: |
|---|---|---|
| <4.0 VDC | 750 milliamperes | (1), (2) |
| >4.0 VDC | 500 milliamperes | (1) |
| >4.1 VDC | 200 milliamperes | (1) |
| >4.2 VDC | 0 milliamperes | (1), (3) |

Notes:
(1) If temperature is within limits for charging.
(2) May begin charging gently if battery state of charge is very low or temperature is too high or too low.
(3) Lithium battery charging is cut off; other battery types may be trickle charged.
(4) Values are examples and will be different for different batteries, e.g., batteries of different capacity and/or from different manufacturers.

A thermistor, e.g., thermistor TR1, may be provided in the case or housing 132 of the charger base 130 to sense the ambient temperature thereof; the thermistor TR1 is not attached to a power transistor or to a power supply or to a heat sink for measuring the temperature or power dissipation thereof. Thermistor TR1 and resistor R18 form a voltage divider that supplies a temperature dependent voltage signal to microprocessor U2, 220 from which microprocessor U2, 220 preferably determines the ambient temperature of charger 100, e.g., for the purpose of controlling the charging current applied to a battery being charged in cradle 110 and/or 120 responsive to ambient temperature. Thermistor TR1 is preferably used to prevent a battery 190 from (a) being charged if the battery is too "hot" (e.g., above 122° F.) or being charged at a high charge current if the battery is "cold" (e.g., below 20° F.), as approximated by the likelihood that the ambient temperature of the charger base 130 is indicative of the temperature of the battery 190 or would be after a period of time. It is noted that the temperatures referred to as "hot" and "cold" may differ for different embodiments and different sizes and types of batteries.

Charger 100 preferably applies charging current only at predetermined fixed levels to charge a battery and need not control, and preferably does not control, the voltage applied to the battery or apply a fixed or predetermined voltage thereto, i.e. it does not provide, and preferably does not provide, a constant voltage to the battery. Preferably, data stored, e.g., in microprocessor 220, U2 or in a memory associated therewith, defines predetermined substantially constant current levels for charging current to be applied to charge battery 190 as a function of open circuit battery voltage, and charger 100 preferably does not need and does not have a table of values that relate a voltage to be applied to the battery 190 to the battery open circuit voltage and/or to an "optimum" battery voltage, and so does not need to and preferably does not measure the voltage applied to battery 190 while battery 190 is receiving charging current. Charger 100 need not and preferably does not measure or calculate the power dissipation of any power supply 168 and need not and preferably does not measure or calculate the power dissipation of any power transistor.

Figure 9A:
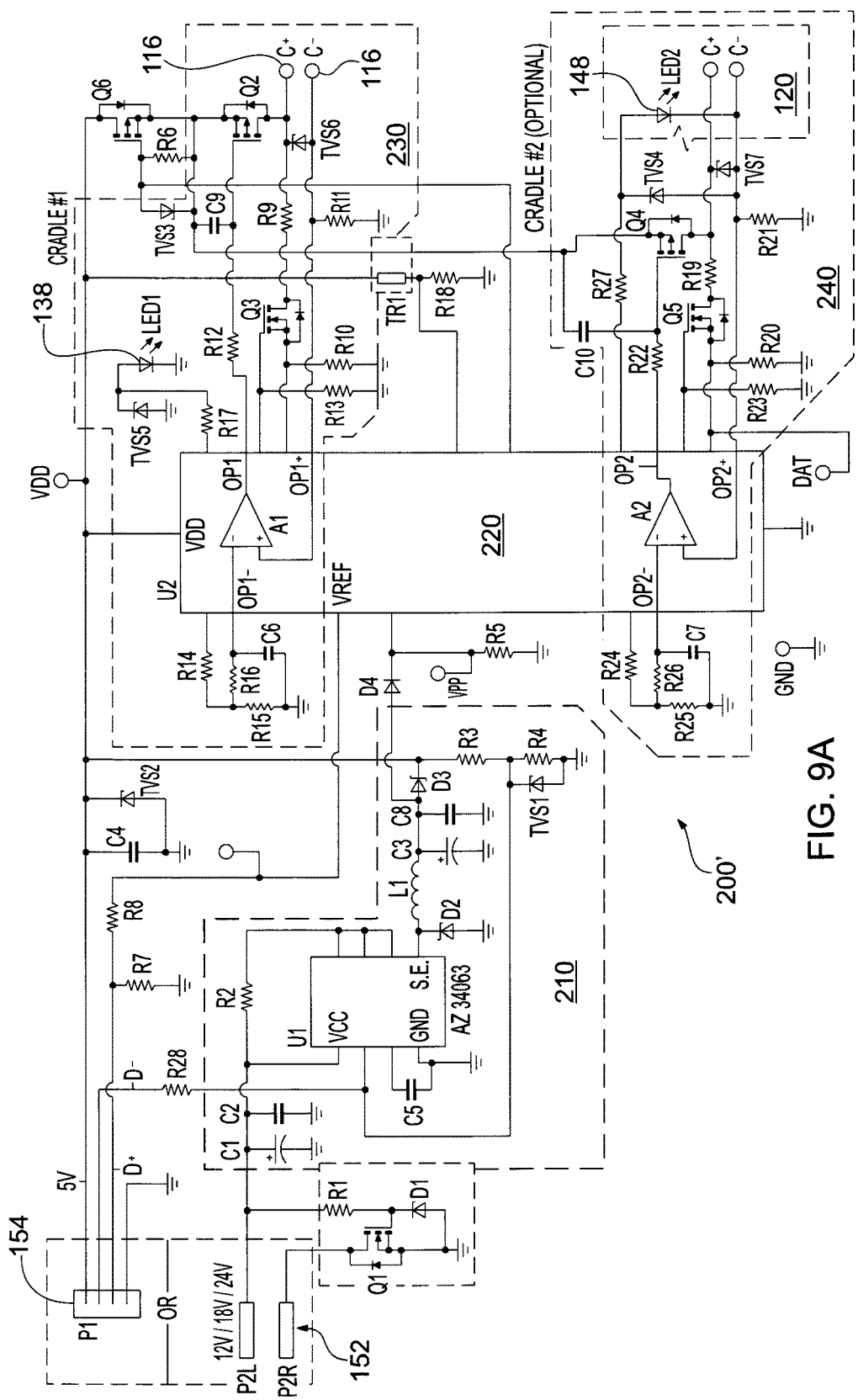
FIG. 9A is an alternative example embodiment of the example electrical circuit of FIG. 9.

Electrical circuit 200' of FIG. 9A is substantially the same as electrical circuit 200 of FIG. 9 with certain changes thereto. For example, plural transient voltage suppression devices TVS are included with TVS1 connected across resistor R4, TVS2 connected across capacitor C4, TVS3 connected across resistor R6, TVS4 connected across indicator LED2, TVS5 connected across indicator LED1 which is reconfigured relative to its drive from processor 220, TVS6 is connected between the C+ and C− terminals 116 of cradle 110, and TVS7 is connected between the C+ and C− terminals of cradle 120. In addition, capacitor C9 is connected across the gate-source terminals of FET Q2 and capacitor C10 is connected across the gate-source terminals of FET Q4. Resistor R28 also assists in suppressing transients.

Each charging circuit 230, 240 of circuit 200 and of circuit 200' preferably operates on a predetermined repeating cycle wherein charging current is provided for a very large portion of the cycle, and is interrupted for a much shorter time during which the open circuit voltage of battery 190 is measured and a predetermined level of charging current, e.g., a substantially constant charging current, is set for the next period of charging based upon the measured open circuit battery voltage. In one example embodiment, each cycle of charging is about 2.10 seconds in duration and charging is interrupted for about 25 milliseconds, e.g., about 1% of the cycle, during which the open circuit voltage $V_{OC}$ of the battery is measured followed by an about 2.07 second charging time, e.g., about 99% of the cycle, at the constant current determined by processor 220 based upon the open circuit voltage $V_{OC}$ measured immediately prior thereto.

While the cycling of the respective charging circuit cycles of circuits 230, 240 for electronic device cradle 110 and battery cradle 120 could be concurrent, i.e. in unison, or their respective repeating cycles could be offset from each other in time, e.g., by about half the cycle time, e.g., by about one second in the example cycles described. Preferably, batteries in both cradles are charged concurrently with priority being given to the battery in cradle 110, which is thought to be more likely to be quickly put back into use, although alternative charging priority may be provided, e.g., preferentially charge the battery in cradle 120, or share the available charging relatively evenly between the batteries in cradle 110 and in cradle 120.

An example of typical values of battery open circuit voltage $V_{OC}$ and corresponding typical charging current levels for an example Lithium-Ion battery is presented in Table II following:

TABLE II

BATTERY CHARGE CURRENT & BATTERY VOLTAGE (4)

| If Battery $V_{OC}$ Is: | Then $I_{CHARGE}$ Should be: | Notes: |
|---|---|---|
| <4.2 VDC then: | 750 milliamperes 0 milliamperes for time $T_D$ | (1), (2) |
| <4.2 VDC | 100 milliamperes | (1) |
| ≥4.2 VDC | 0 milliamperes | (3) |
| <4.05 VDC | If Voc decreases, repeat cycle | |

Notes:
(1) If temperature is within limits for charging, e.g., 50° F. to 101° F..
(2) May begin charging gently if battery state of charge is very low, e.g., $V_{OC}$ is low, or temperature is either too high or too low, e.g., at a temperature less than about 40° F. or higher than about 100° F.
(3) Lithium battery charging is cut off; other battery types may be trickle charged.
(4) Values are examples and will be different for different batteries, e.g., batteries of different capacity, different chemistry, and/or from different manufacturers, and/or at different temperatures (above about 113° F. the charging cut off voltage is about 4.1 VDC).

Because it is desirable to charge or recharge the battery in the shortest time allowable, a constant charging current that is close to a maximum allowable safe charging current may be applied, and so the terminal voltage of the battery being so charged may increase slightly above the voltage representative of being fully charged. When the battery is rapidly charged, e.g., at 500 milliamperes or at 750 milliamperes, its terminal voltage $V_{OC}$ changes and so a "relaxation" time TD may be provided before charging is resumed, e.g., before topping off the charge. The time TD may be a predetermined time, e.g., about 4 minutes or longer, and in a typical example about 4.25 minutes, or may be a function of a predetermined parameter, e.g., of a temperature or a current at which charging was done, which may be measured within charger 100, or may be related to the temperature of the battery being charged. The foregoing does not require that battery temperature or any other parameter be monitored or compensated for, however, it does not preclude such monitoring and/or compensating of temperature or another parameter.

Optionally, but preferably, charger 100 detects which of the possible external charging sources 168 is connected to and supplying charging current to charger 100. External charging power source 168 may be a 12-18 volt or a 12-24 volt source such as may be provided from typical AC power mains or from a vehicle power system, such as battery charger power sources supplied by Streamlight, Inc. of Eagleville, Pa., for various wall and vehicle mountable chargers, or external charging power source 168 may be a USB compatible power source. With such power sources, charging currents of about 750 milliamperes may provided to one battery and/or about 1000 milliamperes (about one ampere) total may be provided to both batteries (both cradles 110, 120).

When charging power is provided from a detected USB external power source, e.g., a laptop computer or smart phone or a typical USB power cube, the maximum current that can be drawn therefrom is limited, e.g., to about 500 milliamperes. In that instance, where only a single battery is present to be charged, e.g., a battery only in cradle 110 or a battery only in cradle 120, but not in both, will be charged using the full available current, e.g., about 500 milliamperes available from the USB external source 168; however, if a battery is also in cradle 120, e.g., there are batteries in both of cradles 110 and 120, then the maximum charging current to the battery in cradle 110 is reduced, e.g., to about 400 milliamperes, and the remainder, e.g., about 100 milliamperes, will be utilized to charge the battery in cradle 120, although other apportionments of the available charging current may be utilized.

If, however, the external USB power source 168 is a Streamlight AC/5V USB power cube adapter that will be made available with the charger 100 described herein, the maximum available current that can be drawn is about 1 ampere (about 1000 milliamperes). Preferably, the Streamlight AC/5V USB power cube adapter has the data+ and data− terminals of its USB connector connected together by a very low resistance, e.g., zero ohms, thereby making its presence easily detectable by processor 220 of circuit 200, 200' of charger 100. Thus, if the battery in cradle 110 is being charged at a constant current of about 750 milliamperes, the remaining about 250 milliamperes of available current may be utilized to charge a battery in cradle 120, assuming that temperature and battery open circuit voltage $V_{OC}$ are within the limits permitting such high current charging, thereby giving priority to the battery in cradle 110 as is preferred in the present example.

Indicator lights LED1 and LED2 relating to cradles 110 and 120, respectively, may be, and preferably are, each energized in different manners so as to convey information about the charging of the battery in each respective cradle 110, 120. For example, the LED indicator may be pulsed, e.g., at once per second, to indicate that the battery being charged is substantially at or near full charge and is in the predetermined time period TD, and the LED indicator may be blinked on and off at a fast rate, e.g., easily observable as being faster than once per second, to indicate an error, e.g., when charging has ceased due to too high or too low a temperature.

When the temperature is either high or low, e.g., less than about 41° F., charge current preferably is limited, e.g., to about 200 milliamperes, and when temperature is less than about 50° F. or higher than about 101° F., charge current preferably may be limited, e.g., to about 490 milliamperes; no charging will be done at temperatures that are too high or too low, e.g., below about 20° F. and above about 122° F. At a temperature above about 113° F., the charging termination voltage is reduced, e.g., from about 4.2 VDC to about 4.1 VDC.

Figure 10:
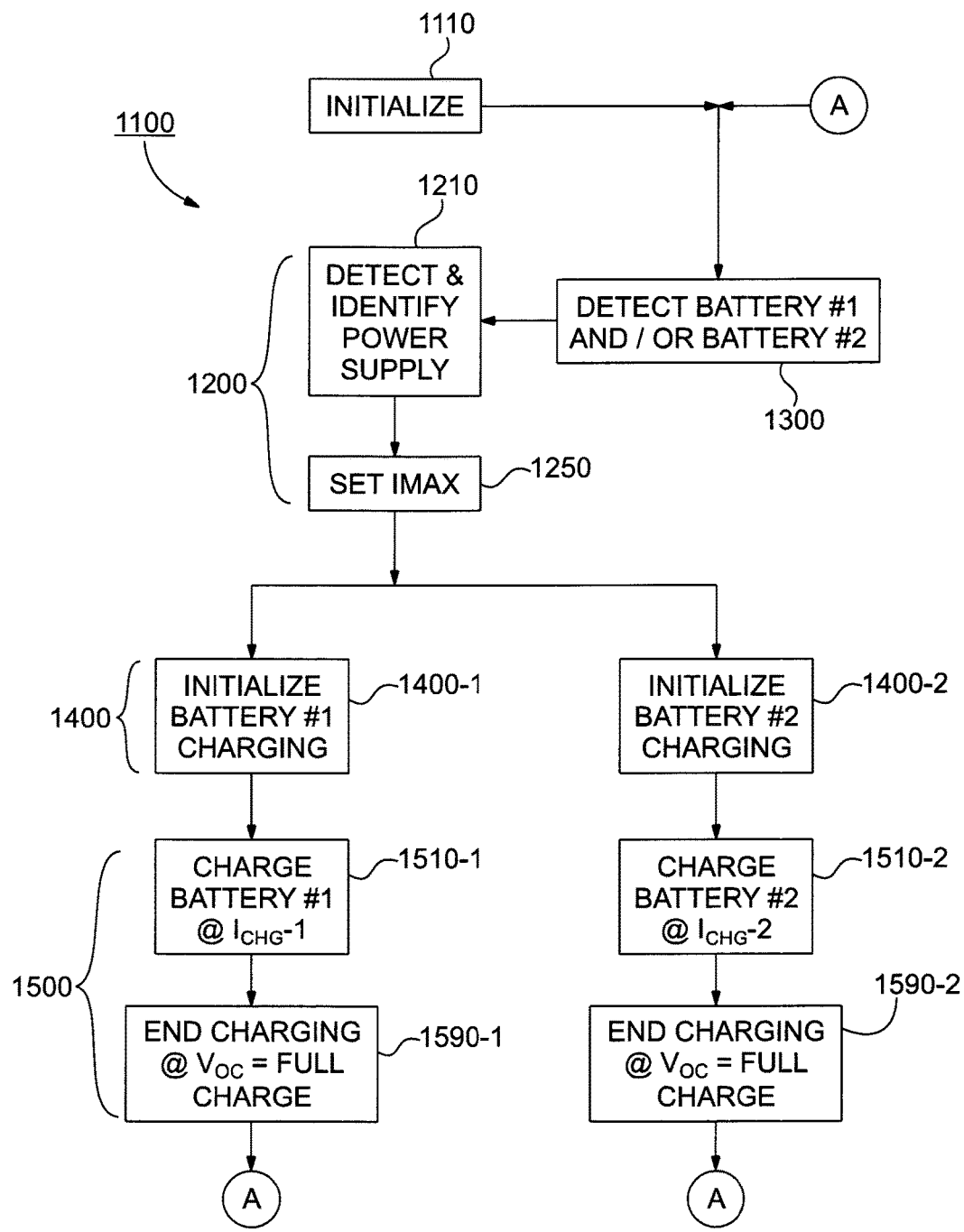
FIGS. 10 and 10A are schematic flow diagrams illustrating an example of the operation of the example embodiment of a battery charger and electrical circuit of FIGS. 1-9A.
Figure 10A:
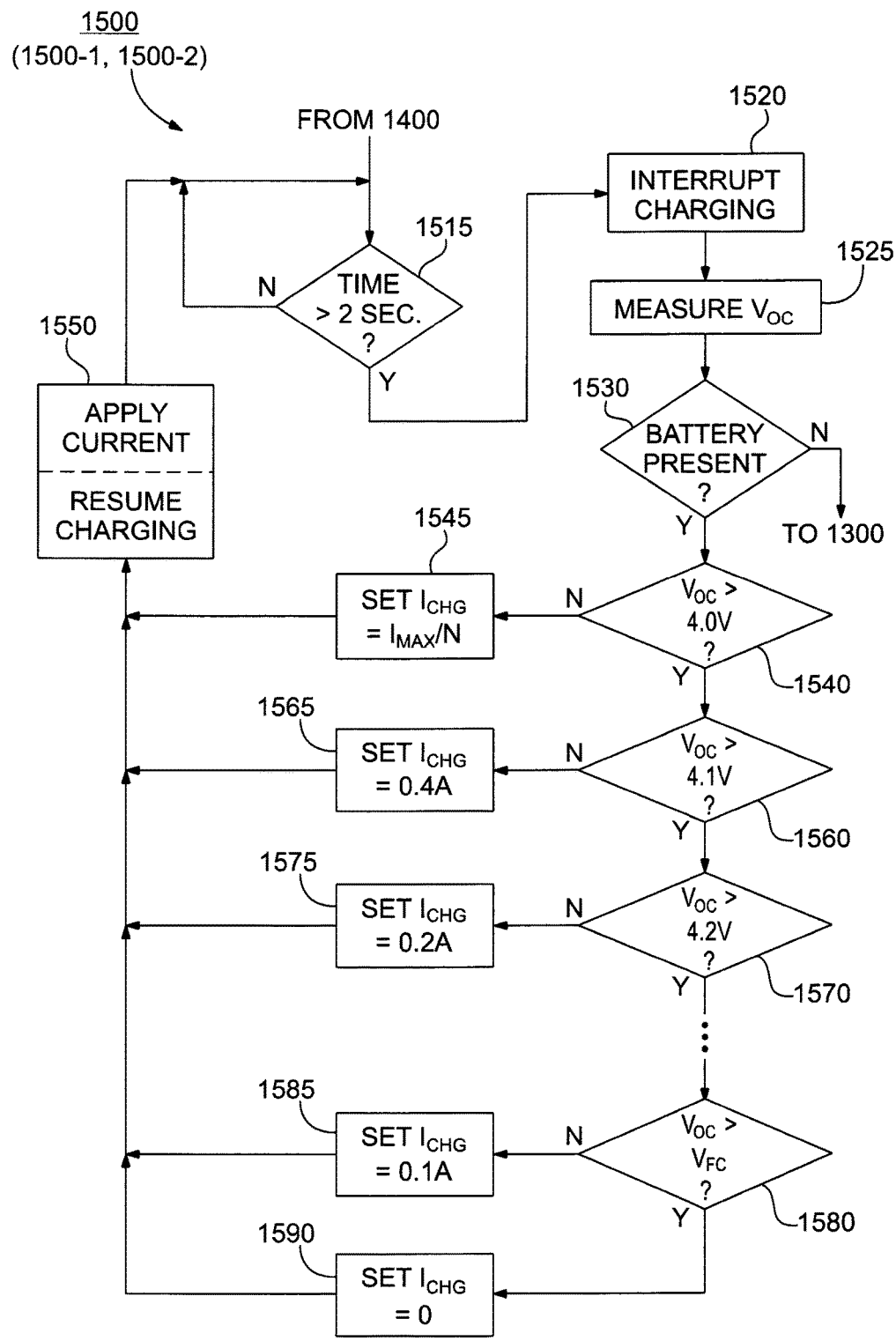

FIGS. 10 and 10A are schematic flow diagrams illustrating an example of the operation 1100 of the example embodiment of a battery charger 100 and electrical circuit 200 of FIGS. 1-9A. In general, FIG. 10 is an overall flow diagram presented to describe the major functions 1100 of battery charger 100 in a general manner with the following FIG. 10A providing further details and/or alternatives for the major functions 1100 of FIG. 10. It is noted that the functions may be performed in a sequence different from the example sequence illustrated unless specifically stated that a particular order or sequence must be followed. It is further noted that some functions described may be removed and/or other functions may be added, as may be expeditious in any particular instance.

Operation or process 1100 is first initialized 1110 upon application of electrical power to the charger 100 so that its operation commences from a known predetermined condition, and then checks 1300 to see if a battery is present, e.g., to detect 1300 if a battery 190 (e.g., in a flashlight 180) is connected in cradle 110 (battery #1), or if a battery 190 is connected in cradle 120 (battery #2), or both cradles 110 and 120.

At some point in process 1100 after a battery is detected 1300, process 1200 commences to detect and identify 1200 the type of power supply 168 that is connected to charger 100 and supplying electrical power thereto. Based upon the type of power supply detected, e.g., upon the level of current that is know to be available from such type of power supply, a maximum current level Imax is established (set) 1250. Process 1200 may be performed at any one of several times, e.g., after a battery is detected 1300 or after charging current is initialized 1400, wherein the latter is currently thought to be preferred.

If the identified power supply 168 is a 12/18/24 VDC power supply 168 connected via connector 152, then the known level of current that can be drawn therefrom may be relatively high, e.g., 1.8-2.5 amperes, however, if the identified power supply 168 is a USB power supply 168 connected via connector 154, then the current that can be drawn may vary over a wide range, e.g., 100 milliamperes to 2.4 amperes, depending upon the nature of the source. Power drawn from the USB port of an electronic device, e.g., a portable computer, may be limited to a low value, e.g., 100 milliamperes, while up to 2.4 amperes may be drawn for a USB wall cube that plugs into a 110-240 VAC wall outlet.

Thereafter, process 1100 proceeds to initialize 1400 the charging current that is applied to battery #1 and/or battery #2, as may been detected 1300. Charge current initialization 1400 is illustrated as separate functions 1400-1 and 1400-2 because the current level must be set for each of the current controlled constant current charging circuits 230, 240, however, the value to which the charging currents are initially set 1400 may be established by the initialization 1110 of process 100. Typically, and preferably, the initial charging current is initially set 1400 to a relatively low value at which it is safe to charge a battery irrespective of temperature and the battery's state of charge, which might be thought of as a safe charging mode.

While the initial charging 1400 usually, and preferably, is the same for both battery cradles 110, 120, subsequent charging 1500 for each battery, labeled as 1500-1, 1500-2 is likely to be at different current levels depending upon the respective states of charge of the two batteries when batteries are present in both cradles 110, 120, and upon the sequence in which charger 100 is programmed to charge batteries 180-190 and 190 when batteries are present in both cradles 110, 120. Thus, due to similarity, only one of each of the charging regimes 1400, 1500 need be described.

As to the sequencing, e.g., priority of charging, for the battery 190 of a flashlight 180 in cradle 110 and for a battery 190 in cradle 120, in one preferred embodiment the charging of flashlight 180 is given preference because it is thought that if both a flashlight 180 and a spare battery 190 are present 1300 in battery charger 100, then it is probably more likely that a user will first remove flashlight 180 for use (desiring that it be substantially if not fully charged) before removing a spare battery 190 for use. In any event, it is preferred that if a flashlight 180 is present 1300, but not a battery 190, or if a battery 190 is present 1300, but not a flashlight 180, then whichever one is present is given charging priority, at least for as long as it is the only one present in charger 100.

Alternatively, the one of flashlight 180 and battery 190 that is closest to being fully charged, e.g., as determined from its open circuit voltage, could be given priority in charging, or an extra battery 190 could be given priority over a flashlight 180, or both could be given the same priority. When both are given the same priority, charging both simultaneously at a reduced charge current level or charging both contemporaneously at a relatively higher current level on alternating repetitions of the relatively short about 2 second charging time of the repeating cycles described herein typically might lengthen the time necessary for either or both to reach full charge.

Returning to operation 1100, each battery is charged under the same charging process 1500 although the particular levels of current applied at any time will be separately determined based upon the parameters of each particular battery, e.g., as determined by its open circuit voltage. Each process 1500 (1500-1, 1500-2) begins by counting time to determine 1515 whether the predetermined charging time has been reached. If not 1515N, it continues counting time 1515. When the predetermined cycle time, e.g., 2 seconds, has been reached 1515Y, charging is interrupted 1520 for a short interval sufficient to measure 1525 the open circuit voltage Voc of the battery which is then receiving no charging current. Therein, measuring 1525 Voc also includes determining 1530 whether a battery is still present and if not 1530N, returning to battery detection process 1300. If a battery is present 1530Y, then the charging 1535-1580 of that battery commences and/or continues.

Charging 1500 includes repetitively measuring the open circuit battery voltage Voc in each repeating cycle and setting a level of charge current for the next cycle that is determined 1535-1580 based upon the measured open circuit battery voltage Voc of the battery immediately preceding that cycle. Recall that the charging current was initially set to a relatively low level that is deemed to be safe. If Voc is determined 1535 to not be greater than a voltage Vsafe which is a minimum battery voltage at which charging at a relatively high current is safe, then 1535N returns to process 1400 where the battery is charged at the safe relatively low current.

If Voc is determined 1535 to be greater than a relatively low voltage Vsafe indicating that charging of the battery can begin in earnest, then 1535Y is followed and if the measured battery voltage Voc is determined 1540 to be less than a first predetermined voltage, then 1540N is followed and the charging current is set 1545 to a relatively high value Ichg=Imax/N, wherein Imax/N is the lower of the maximum current that can safely be applied to charge the battery 180, 190 and the maximum current that may be drawn from power supply 168 divided by the number N of batteries to be charged simultaneously or contemporaneously. Having established (set) 1545 the predetermined level of charging current to be applied, charging resumes 1550 applying that predetermined level of charging current to the battery for the present repetitive charging cycle.

Thus begins a series of determinations 1540, 1560, 1570, . . . 1580 wherein the last measured 1525 battery voltage Voc is compared to a set of different predetermined voltages to determine 1540, 1560, 1570, . . . 1580 the level of charging current that is to be applied 1550 to charge the battery for the immediately following charging interval. Depending upon the last measured 1525 value of battery open circuit voltage Voc, a predetermined level of charge current is selected (set) 1545, 1565, 1575, . . . 1585 and is applied 1550 to charge the battery for the immediately following charging interval.

The determinations 1540, 1560, 1570, . . . 1580 occur by following the Y paths from each until a negative determination 1540, 1560, 1570, . . . 1580 is made and the N path from that comparison 1540, 1560, 1570, . . . 1580 is followed to set 1545, 1565, 1575, . . . 1585 the charge current level. In this description and the Figures to which it relates, an ellipses (" . . . ") is used to indicate that a greater or lesser number of steps, e.g., comparisons 1540, 1560, 1570, ... 1580 and current settings 1545, 1565, 1575, ... 1585, could be employed.

If all of comparisons 1540, 1560, 1570, ... 1580 are negative, one of their possible N paths is followed, and battery charging continues 1550 at the last set 1545, 1565, 1575, ... 1585 level of charging current. If the battery open circuit voltage Voc is determined 1580 to be equal to or greater than a predetermined voltage Vfc that is indicative that the battery is fully charged, then 1580Y is followed and the charging is terminated 1590, i.e. the charging current is set 1590 to zero current.

At this point, the charging cycling 1500 continues to repeat at the predetermined repetitive cycle time, e.g., at the about 2.1 seconds. If the flashlight 180 and/or battery 180, as the case may be, continues to present an open circuit voltage Voc that equals or exceeds the full charge voltage Vfc, charging current remains set 1585 at zero, and should the open circuit voltage Voc decrease to below the full charge voltage Vfc, charging current will be set 1545, 1565, 1575, ... 1585 in accordance with the then presented open circuit voltage Voc.

The foregoing processes 1400, 1500 repeat until one or both of the flashlight 180 and/or battery 190 are removed from the respective cradle 110, 120 of battery charger 100 whereat the affected charging cycle 1400, 1500 return to detection 1300 and the unaffected charging cycle 1400, 1500 continues as described.

Figure 11A:
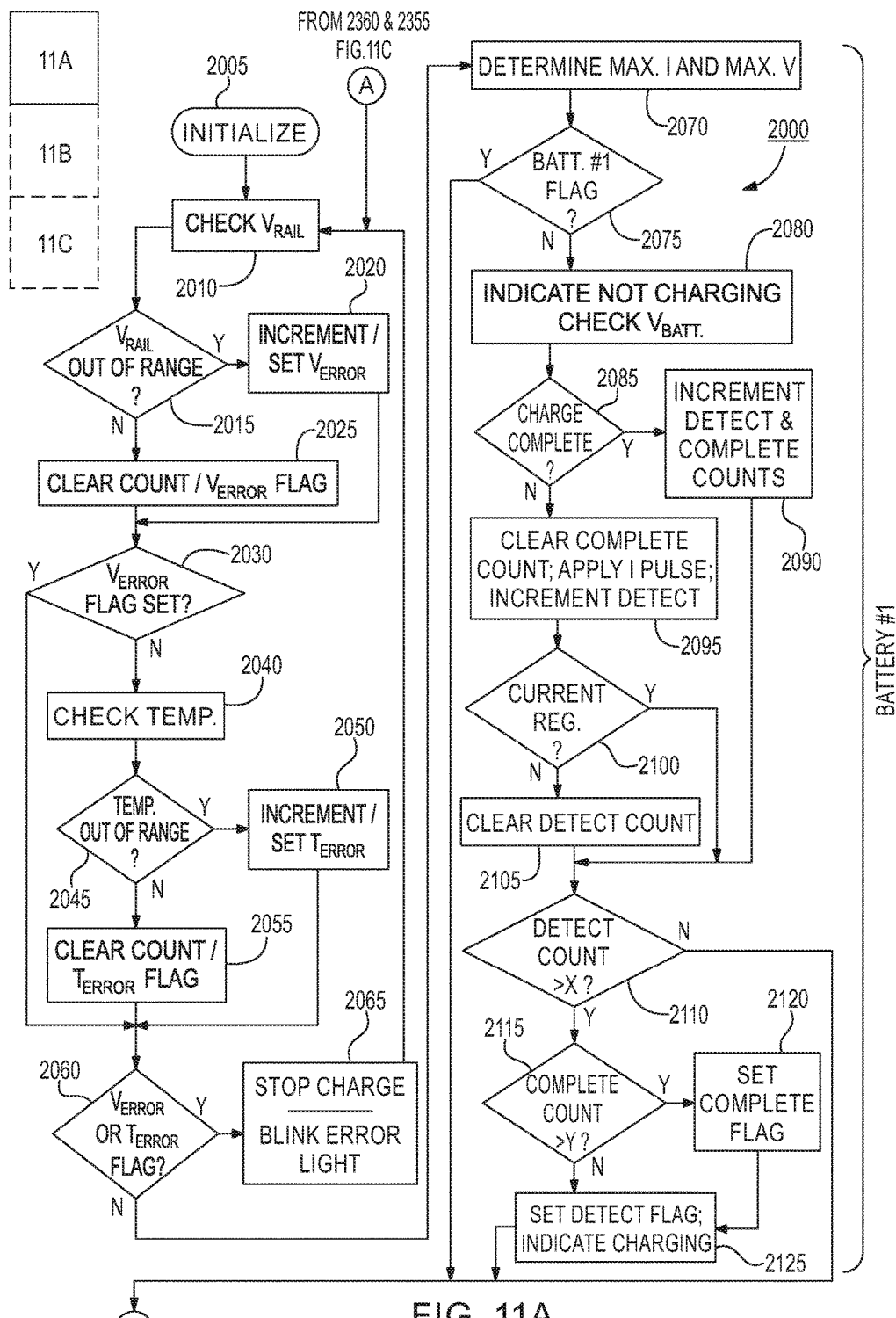
FIGS. 11A, 11B and 11C are together a single schematic flow diagram illustrating an alternative example of the operation of the example embodiment of a battery charger and electrical circuit of FIGS. 1-9A.
Figure 11B:
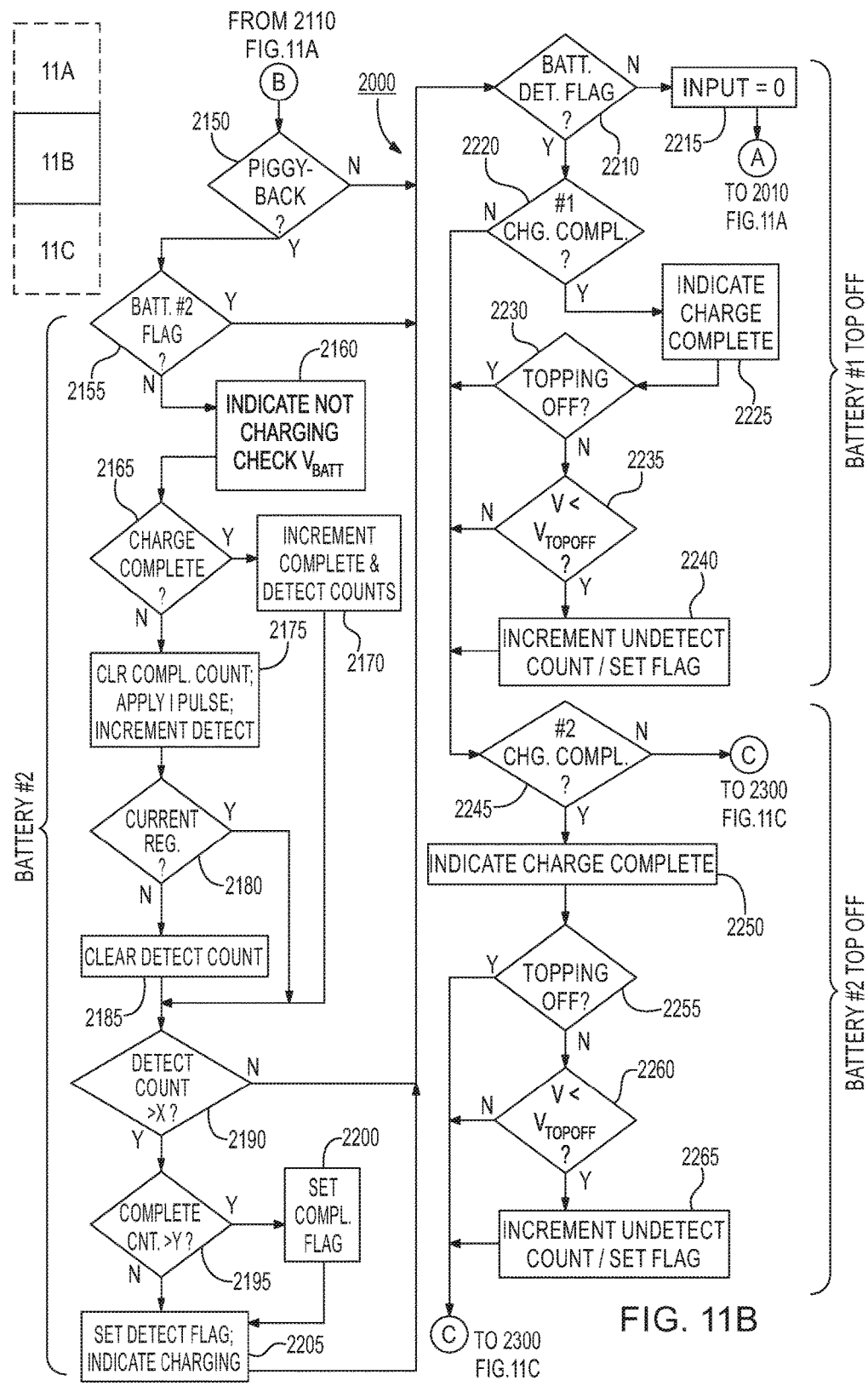
Figure 11C:
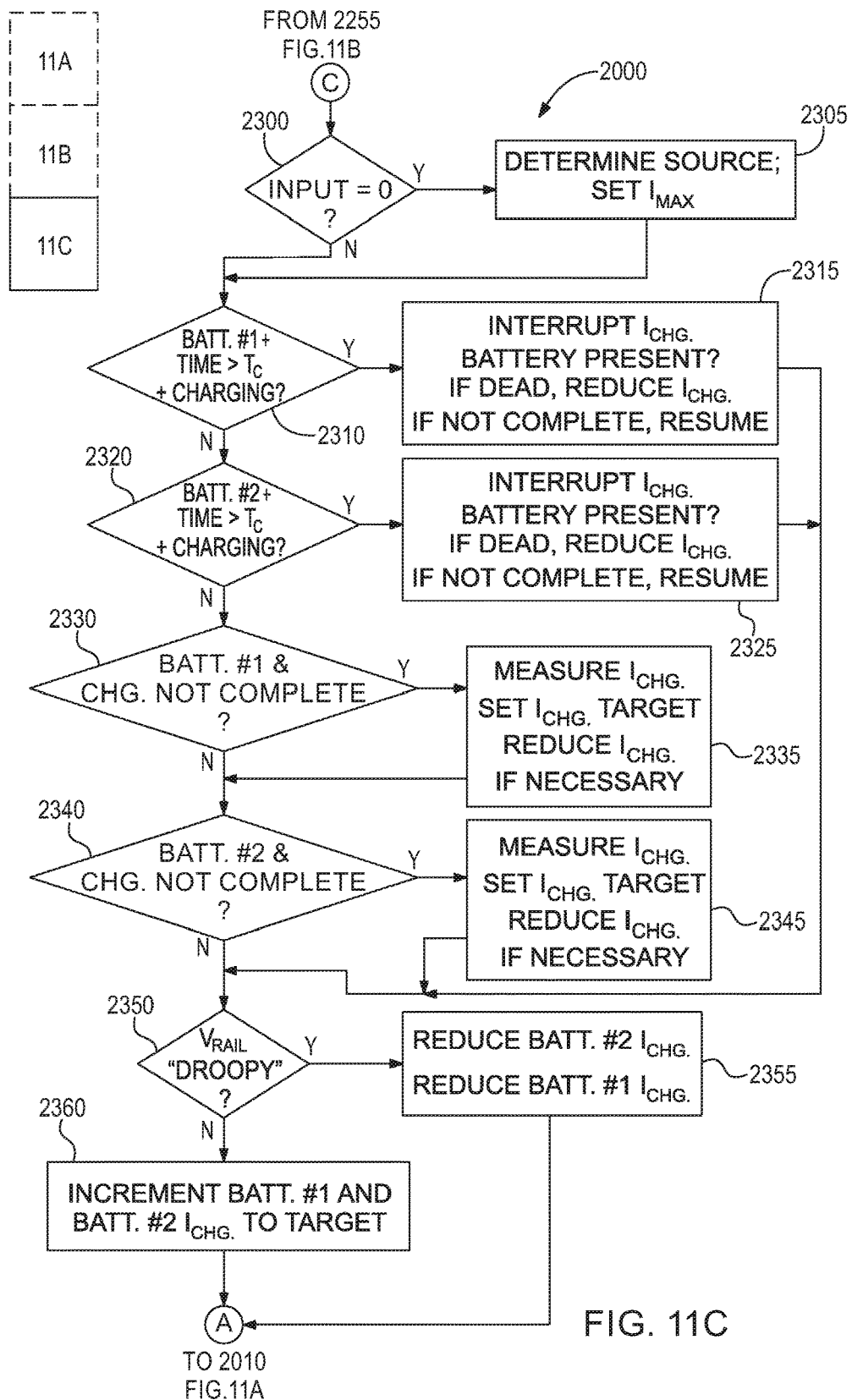

FIGS. 11A, 11B and 11C are together a single schematic flow diagram illustrating an example of an alternative operation 2000 of the example embodiment of a battery charger 100 and electrical circuit 200 of FIGS. 1-9A. It is noted that the functions of operation 2000 or process 2000 may be performed in a sequence different from the example sequence illustrated unless specifically stated that a particular order or sequence must be followed. It is further noted that some functions described may be removed and/or other functions may be added, as may be expeditious in any particular instance. Process 2000 begins with the initialization 2005 of the charger electronic circuitry 200 so that process 2000 commences from a known state, e.g., upon initially being powered on and after a power interruption or outage.

It is noted that process 2000 repeats periodically so that the status of charger 100, the charging of battery #1 in cradle 110, the charging of battery #2 in cradle 120, the parameters thereof established for safe charging and or other safety and other reasons, are all repetitively monitored and adjusted so the batteries #1 and #2 may be rapidly and efficiently charged under whatever conditions are detected. Typically, process 2000 is repeated many times during each cycle of battery charging and voltage Voc measuring, e.g., 32 times per each cycle of 1.1 or 2.1 seconds in the examples herein.

First, the presence of a rail voltage is checked 2010, 2015 to begin verifying that input power is being received 2010 from an external source 168 of charging power and whether the rail voltage is within a predetermined acceptable range of voltages 2015, e.g., either by testing 2015 whether it is outside of that range (as illustrated) or whether it is within that range. If the rail voltage Vrail is outside the predetermined range, then 2015—Y ("Y" indicates "yes" and "N" indicates "no") is followed and a Verror count is incremented 2020 or a Verror flag is set 2020 thereby to indicate an out of range condition. If the rail voltage Vrail is within the predetermined range, then 2015—N is followed and the Verror flag or count is cleared 2025 thereby to indicate an in-range value of the Vrail input voltage.

The Vrail error flag or count is tested 2030 and if the error flag or count is set, then 2030—Y is followed directly to step 2060. If the Verror flag or count is not set, then 2030—N is followed and the temperature is checked 2040 to determine, e.g., whether it is safe to charge the battery and if so, at what constant current level. Temperature is checked 2040, 2045 to begin verifying whether the temperature is within a predetermined acceptable range of temperature 2045, e.g., either by testing 2045 whether it is outside of that range (as illustrated) or whether it is within that range. If the temperature is outside the predetermined range, then 2045—Y is followed and a Terror count is incremented 2050 or a Terror flag is set 2050 thereby to indicate an out of range condition. If the temperature is within the predetermined range, then 2045—N is followed and the Terror flag or count is cleared 2055 thereby to indicate an in-range or acceptable temperature.

If a Verror or Terror flag is set 2060, then battery charging should not be commenced or continued and 2060—Y is followed to stop charging 2065 and to blink an indicator light 2065, e.g., if a battery is detected as being present in a cradle 110, 120, and to return to step 2010. If a Verror or Terror flag is not set 2060, then battery charging should be commenced or continued and 2060—N is followed to determine 2070 the maximum level of constant current charging allowable and the charge completion voltage Voc based upon the last determined temperature 2040.

If a battery #1 flag is set 2075, e.g., a battery has been detected as being present in cradle 110, 2075—Y is followed to go to step 2150. Detection of the presence of a battery may employ any one of several tests, e.g., signaling the charge current circuit 230 or 240 to apply a short duration pulse of charging current while monitoring the charging current feedback, e.g., via resistor R11 or R21, to determine whether such current actually flows because current will only flow if a battery is connected to terminals 116 of cradle 110 or to those of cradle 120.

If a battery #1 flag is not set 2075, e.g., a battery was not detected as being present in cradle 110, 2075—N is followed to indicate 2080 that the battery is not charging and to check 2080 the battery voltage Voc. If the battery voltage Voc indicates 2085 that charging is complete, then 2085—Y is followed and the battery detected and charge complete counts are incremented 2090 and process 2000 proceeds to 2110. If the battery voltage Voc indicates 2085 that charging is not complete, e.g., the battery is not fully charged, then 2085—N is followed and the charge complete count is cleared 2095, a pulse of charging current is applied 2095 and the battery detected count is incremented 2095.

If the charging current is regulating to a constant current 2100, then a battery is present and being charged and 2100—Y is followed to 2110. If the charging current is not regulating 2100, then 2100—N is followed to clear 2105 the battery detected count. If the detected count is not at or above a predetermined count 2110, e.g., the detect count is not great enough 2110, then 2110—N is followed to step 2150. If the detected count is at or above a predetermined count 2110, e.g., the detect count is great enough 2110, then 2110—Y is followed to determine 2115 if the complete count is enough. If the complete count is enough 2115, then 2115—Y is followed, the charge complete flag is set 2120, and process 2000 proceeds to step 2125. If the complete count is not enough 2115, then the battery should continue charging and so 2115—N is followed, the detect flag is set 2125, the charging indicator light is energized to indicate 2125 that the battery is charging, and process 2000 proceeds to step 2150. Thus far in example process 2000, at least the initial setting up of the charging of a battery in cradle 110 for which charging priority is desired to be given is established.

Step 2150 determines whether charger 100 is in a "piggyback" configuration, e.g., whether or not an auxiliary cradle 120 is present in addition to the primary cradle 110 included in housing 110. If an auxiliary cradle 120 is not present, then 2150—N is followed to proceed to step 2210. If auxiliary cradle 120 is present, then 2150—Y is followed to determine 2155 whether a battery is present in cradle 120, e.g., as indicated by a battery #2 detected flag being set 2155. If yes, then 2155—Y is followed to proceed to step 2210. If a battery is not detected 2155 in cradle 120, then 2155—N is followed to step 2160.

Steps 2155 through 2205 relating to battery #2, e.g., the battery in cradle 120, are exactly parallel to and substantially the same as steps 2075 through 2125, and so will not be separately described herein. Steps 2155 through 2205 are described by the description of steps 2075 through 2125 if 80 is added to the item numbers set forth in the description of steps 2075 through 2125, respectively.

If neither battery flag is set 2210, then no battery is present and 2210—N is followed to step 2215 to set an input source flag to "0" to force a redetermination of the charging current level at step 2300. Step 2215 proceeds to step 2010. If either battery flag is set, then 2210—Y proceeds to step 2220 to control the charging of battery #1, e.g., the battery in cradle 110.

Control of the charging of battery #1 proceeds as follows: First, completeness of charging is determined 2220, e.g., by testing the battery voltage Voc against a predetermined charging termination voltage, e.g., 4.2 VDC. Steps 2220-2235 can check whether the battery is currently being "topped off," because after charging is complete, the battery could be in the relaxation time, in topping off, or has completed topping off after which the battery voltage is monitored to determine whether the battery voltage Voc has dropped below a predetermined threshold voltage, e.g., 4.05 VDC, indicating that charging should be resumed or the battery has been removed. If the charging of battery #1 is not complete 2220, then 2220—N is followed to step 2245 for beginning a parallel and substantially the same charging control process for battery #2. If the charging of battery #1 is complete 2220, then 2220—Y is followed to step 2225 for energizing the charging indicator light to indicate that charging of battery #1 in cradle 110 is complete, e.g., flashing at a once per second rate. If complete, the battery voltage Voc is monitored 2230 to determine if "topping off" the charge 2230 is being performed. Topping off is done after a period of time commencing at the indication of completion of charging and ending at a later time, e.g., either based upon a predetermined time, by a temperature, or by a combination thereof. Topping off may comprise charging at a lower constant current, e.g., at about 100 milliamperes. If topping off 2230 is yes, then 2230—Y is followed to step 2245. If topping off 2230 is no, then 2230—N is followed to determine 2235 whether the battery voltage Voc is less than the voltage indicating that restarting charging should occur, e.g., the charge restart voltage of about 4.05 VDC. If it is not, then 2235—N is followed to step 2245. If it is, then 2235—Y is followed to increment 2240 the undetected count and set 2240 an undetected flag, and proceed to step 2245.

Steps 2245 through 2265 relating to battery #2, e.g., the battery in cradle 120, are exactly parallel to and substantially the same as steps 2220 through 2240 and so will not be separately described herein. Steps 2245 through 2265 are described by the description of steps 2220 through 2240 if 25 is added to the item numbers set forth in the description of steps 2220 through 2240, respectively. The completion of steps 2245-2265 and of steps 2220-2240 both lead the process 2000 to step 2300. Steps 2245—N, 2255—Y, 2260—N, and 2265 lead the process 2000 to step 2300.

Step 2300 determines 2300 whether the input source flag is determined yet, e.g., what type of source is present. If zero, then the type of source is not determined and 2300—Y is followed to determine the source 2305 that is present, e.g., the type of external source of charging power 168 that is connected, e.g., a Streamlight USB source being indicated by a very low or zero resistance between its data+ and data− terminals, and to set 2305 the maximum current that will be drawn from that source. Once the type of source 168 is determined, the value of the input source flag is set to a value corresponding to the current level that is available from the determined type of source. If the input source 168 is already determined, then 2300—N is followed to step 2310 as also follows step 2305.

Charging status for battery #1 is determined 2310. If battery #1 is present and if the predetermined charging time between battery voltage measurements has been fulfilled and if battery #1 is charging, then 2310—Y is followed to measure 2315 the battery open circuit voltage Voc. This step 2315 includes interrupting 2315 the charging current to battery #1 and measuring the open circuit voltage Voc at the charger terminals 116, checking (verifying) 2315 that battery #1 is still present in cradle 110, reducing 2315 the maximum allowable battery charging current setting if the voltage Voc of battery #1 is below a predetermined threshold considered to indicate that battery is substantially discharged, e.g., "dead," and resuming 2315 constant current charging of battery #1 if the charging thereof is not complete, e.g., as indicated by its open circuit voltage Voc being below the charge termination voltage. If test 2310 is negative, then 2310—N is followed to step 2320. At the completion of step 2315 which follows from step 2310—Y, the process 2000 proceeds to step 2350.

Charging status for battery #2 is determined 2320. Steps 2320 and 2325 are parallel to and substantially the same as steps 2310 and 2315 for battery #1 and will not be separately described, except to state that steps 2320-2325 pertain to battery #2, e.g., a battery in cradle 120. Step 2325 also leads to step 2350, as do steps 2310-2315, and step 2320—N goes to step 2330. Step 2320—N goes to step 2330. At the completion of step 2325 which follows from step 2320—Y, the process 2000 proceeds to step 2350.

Charging of battery #1 is resumed 2330-2335. If battery #1 is detected 2330 and its charging is not complete, then 2330—Y is followed to resume charging 2335 of battery #1. Resuming charging 2335 includes measuring 2335 the constant current charging current, checking 2335 that battery #1 is still present, setting 2335 a target value for the constant current charging of battery #1 based upon, e.g., temperature, its state of charge, e.g., as indicated by its voltage Voc, and the type of input source present, e.g., the type of external charging current power source 168, and reducing 2335 the charging current if it is above the newly set target value. If test 2330 is negative, then 2330—N is followed to step 2340 and at the completion of step 2335 the process 2000 also proceeds to step 2340.

Charging of battery #2 is resumed 2340-2345. Steps 2340 and 2345 are parallel to and substantially the same as steps 2330 and 2335 for battery #1 and will not be separately described, except to state that steps 2340-2345 pertain to battery #2, e.g., a battery in cradle 120. Both lead to step 2350, and preferably after the constant charging currents for batteries #1 and #2 have been set and applied.

The particular external charging current power source 168 that is connected to charger 100, from which the electrical power from which the constant currents that charge batteries #1 and #2 are drawn, is tested to determine 2350 whether it has sufficient capacity to supply those charging currents. Testing step 2350 is preferably performed by measuring the input voltage to charger 100, e.g., at input connectors 152 or 154, but particularly at input connector 154 to which a USB power source 168 can be connected. The external power source 168 provided by Streamlight, Inc. with the portable light described herein, as well as with previous lights, can typically provide electrical power that is more than sufficient to charge the light described herein.

USB power sources 168, e.g., USB power cubes (other than the Streamlight AC/5V USB adapter), typically have a much more limited capacity to provide charging power at +5 VDC to charger 100, e.g., many provide only about 500 milliamperes at +5 VDC, and so when current beyond that capacity is drawn, the voltage at connector 154 tends to decrease, or experience "droop," to a lower voltage. If the detected 2350 voltage "droops" below a predetermined voltage, e.g., about 4.52 volts, then 2350—Y is followed and the battery charging currents are reduced 2355. For example, the maximum charging current to battery #1 will be reduced 2355, e.g., in increments from as much as about 750 milliamperes, to a lower level so that the total charging current to batteries #1 and #2 is similarly reduced, thereby reducing the current drawn from external power source 168. In a preferred arrangement wherein the charging of the battery #1 in cradle 110 is given priority regarding charging, the charging current to battery #2 is reduced, thereby to reduce the current drawn from external power source 168, before the charging current to battery #1 is reduced.

Reducing the current drawn from external power source 168 allows the voltage provided thereby to recover, e.g., to droop less, until the voltage from external power source 168 returns to an acceptable level, e.g., above about 4.52 volts. In a preferred example, the charging currents to battery #1 and to battery #2 are both reduced 2355 sufficiently for the voltage provided by external power source 168 to recover. Process 2000 then returns to step 2010 and begins another in its sequence of repetitive cycles. An advantage of the foregoing arrangement is that the current draw is automatically reduced to a level that does not draw excessive current from the external power source 168 without having to know a priori or determine the actual current supplying capacity of source 168, which is seen to increase flexibility to operate charger 100 with a wide variety of different capacity USB power sources.

It is noted that voltage droop is not expected when the external source 168 is one of the 12, 18 or 24 VDC sources which is configured to provide sufficient power for charging such portable lights 110 with the maximum charge currents as described herein. Likewise, voltage droop is not expected when external source 168 is the Streamlight AC/5V USB cube which is also configured to supply sufficient power to charge the battery or batteries as the maximum charge currents described. However, for other USB power sources, e.g., a USB connector of a laptop computer or a smart phone charger, if the source is unable to supply the nominal 500 milliampere that the charger is programmed to draw, then the voltage provided by the USB source 168 will droop and the charging current will be reduced. Because in the example described, charging of the battery in cradle 110 is presumed to be given priority in charging, then any charging current being provided to a battery in auxiliary cradle 120 will be reduced before the charging current to the battery in cradle 110 will be reduced. If the charging current to cradle 120 has already been reduced to a predetermined minimum charging current, e.g., about 75 milliamperes, and voltage droop is still detected, then the charging current to cradle 110 will be reduced in increments towards a minimum nominal value, e.g., about 100 milliamperes. The 400 milliampere charging current example above for cradle 110 with a 100 milliampere charging current for cradle 120 is just an example, e.g., at the end of or in a sequence of incremental reductions controlled by process 2000. This preferred arrangement, may be varied, e.g., as different priority for charging may be desired as between the batteries in cradles 110 and 120.

If the source 168 voltage is not droopy 2350, then 2350—N is followed and the charging currents to batteries #1 and #2 is incremented 2360 upward over a number of repetitive cycles of process 2000 until the target current (see 2335, 2345) is reached. Process 2000 then returns to step 2010 and begins another in its sequence of repetitive cycles.

In a typical embodiment, housings 130 and 140, and parts thereof such as spring arms 112, may be of any suitable metal, e.g., a cast, machined or stamped aluminum, or a suitable plastic material, e.g., preferably a molded plastic such as a nylon, engineered nylon, ABS plastic, polycarbonate, polyethylene, or other resin, with or without a reinforcing material such as a fiberglass, carbon fiber, or the like, or any other suitable plastic or other moldable material. Reinforcing materials may provide improved strength, impact resistance, dimensional stability and/or consistency, high temperature stability, and the like.

A battery charger 100 may comprise: a housing 110 having at least one cradle 110, 120 including electrical contacts for receiving a rechargeable battery 180, 190; a connector port 150 on the housing 130 for receiving at different times at least two electrical plug connectors 162, 164, 300 having different electrical contact configurations; first and second electrical receptacles 152, 162 disposed in the connector port 150 of the housing 130 for receiving at different times respective first and second electrical plug connectors 162, 164, 300 that are respectively associated with first and second electrical power supplies 168; the first electrical receptacle 152, 154 having a contact configuration that may be different from the contact configuration of the second electrical receptacle 154, 152; the first and second electrical receptacles 152, 154 being closely adjacent each other such that an electrical plug connector 152, 154 inserted into one of the first and second electrical receptacles 152, 154 physically interferes with and prevents an electrical plug connector 154, 152 from being plugged into the other of the first and second electrical receptacles 152, 154; and an electrical circuit 200 disposed in the housing for coupling electrical power received at the first and second electrical receptacles 152, 154 to the electrical contacts of the at least one cradle 110, 120 of the housing. The connector port 150 may define an opening that includes a substantial part of an outline of a first electrical plug connector 162, 164 and a substantial part of an outline of a second electrical plug connector 164, 162, wherein parts of the outlines of the first and second electrical plug connectors 162, 164 overlap within the opening of the connector port 150. One of the first and second electrical receptacles 152, 154 may include a USB connector. The at least one cradle 110, 120 of the housing 130 may include: a pair of spring biased arms 112 for retaining an electronic device 180 including the rechargeable battery 190 therein, and optionally may include a second cradle 120 for receiving a second rechargeable battery 190 therein. The at least one cradle 110, 120 of the housing 130 may include: a guide member 114 for locating an electronic device 180 including a rechargeable battery 190 therein and a pair of spring biased arms 112 for retaining the electronic device 180 therein. The rechargeable battery 190 may be included in an electronic device 180 that is configured to be retained in the at least one cradle 110, 120 of the housing 130. The at least one cradle 110, 120 of the housing 130 may include first and second cradles 110, 120, the first cradle 110 being configured to receive an electronic device 180 including a rechargeable battery 190 therein and the second cradle 120 being configured to receive a rechargeable battery 190 therein. The electrical circuit 20 may include a DC converter 210 having an input coupled to one of the first and second receptacles 152, 154 and an output coupled to the electrical contacts of the at least one cradle 110, 120. The DC converter 210 may be coupled to the electrical contacts of the at least one cradle 110, 120 by a circuit 220, 230, 240 providing a constant current to charge a battery 180, 190 connected to the electrical contacts of the at least one cradle 110, 120. The constant current provided to a rechargeable battery 180, 190 connected to the electrical contacts of the at least one cradle 110, 120 may have a magnitude determined as a function of the open circuit voltage of the rechargeable battery 180, 190. One or more guides 156, 400 may extend from the housing 130 adjacent at least one of the first and second electrical receptacles 152, 154 for aligning a mating connector 162, 164, 300 with respect to the at least one of the first and second electrical receptacles 152, 154. The one or more guides 156, 400 extending from the housing 130 may have a groove 420: for aligning a rib 320 of a mating connector 300 with respect to the at least one of the first and second electrical receptacles 152, 154, or for receiving a raised guide 330 of a mating connector 300 for defining a single physical orientation for mating the mating connector 300, or for aligning a rib 320 of a mating connector 300 with respect to the at least one of the first and second electrical receptacles 152, 154 and for receiving a raised guide 330 of a mating connector 300 for defining a single physical orientation for mating the mating connector 300. The battery charger 100 may be in combination with an electronic device 180 including a rechargeable battery 190 therein that is rechargeable in the at least one cradle 110, 120 of the battery charger 100. The at least one cradle 110, 120 of the housing 130 may include: one or more electrical contacts configured for making electrical connection to a rechargeable battery 190; or one or more electrical contacts configured for making electrical connection to an electronic device 180 including a rechargeable battery 190; or one or more electrical contacts configured for making electrical connection to a rechargeable battery 190 and one or more electrical contacts configured for making electrical connection to an electronic device 180 including a rechargeable battery 190. A first of the at least two electrical plug connectors 162, 164, 300 may be of a male or female gender; or a second of the at least two electrical plug connectors 162, 164, 300 may be of a male or female gender; or the first electrical receptacle 152, 162 may be of a male or female gender; or the second electrical receptacle 152, 162 may be of a male or female gender; or any compatible mate-able combination thereof. The battery charger 100 may be in combination with a power supply 168 having an electrical plug connector 162, 164, 300 that is insertable into one of the first and second electrical receptacles of the battery charger 100. The housing may include a sensor responsive to the temperature thereof and coupled to the electrical circuit. The electrical circuit 200 may be configured to charge a rechargeable battery 180, 190 disposed in the at least one cradle 110, 120 by: a) setting 1400, 2070 an initial charge current level that is substantially lower than a charge current that the battery 180, 190 can accept; b) repetitively interrupting 1520, 2310, 2320 charging 1500, 1520, 2315, 2325 of the battery 180, 190 at a predetermined timing to define a periodic cycle, and for each periodic cycle: measuring 1525, 2315, 2325 an open circuit voltage of the battery 180, 190 when charging of the battery 180, 190 is interrupted, determining 1540-1580, 2335, 2345 from the measured open circuit voltage of the battery 180, 190 a corresponding predetermined level of charging current to be applied to the battery 180, 190; applying charging current 1550, 2315, 2325, 2335, 2345 to the battery 180, 190 at the predetermined level of charging current; and c) repeating 1550-1515, 2355-2010, 2360-2010 the periodic cycle at least until the open circuit voltage of the battery 180, 190 is at a predetermined voltage indicative of the battery 180, 190 being fully charged or until the battery is disconnected from the at least one cradle. One of the first and second electrical receptacles 152, 154 may include a connector guide 400, 156 and wherein an electrical connector 164, 300 configured to mate therewith may comprise: an elongated connector body 310 defining a longitudinal direction and having an electrical cable 166 extending from the connector body 310; an electrical connector frame 164P at one end of the elongated connector body 310; a longitudinal alignment feature 320 on the elongated connector body 310 configured for aligning the elongated connector body 310 with the connector guide 400, 156; a guide feature 330 on the elongated connector body 310 defining a unique orientation of the elongated connector body 310; and a retaining feature 340 on the elongated connector body 310 configured for retaining the elongated connector body 310 in the connector guide 400, 156, whereby the elongated connector body 310 when inserted into the connector guide 400, 156 is aligned with the connector guide 400, 156 by the longitudinal alignment feature 320, is in the unique orientation defined by the guide feature 330 and is retained in the connector guide 400, 156 by the retaining feature 340.

A connector 164, 300 may comprise: an elongated connector body 310 defining a longitudinal direction and having an electrical cable 166 extending from the connector body 310; an electrical connector frame 164P at one end of the elongated connector body 310; a longitudinal alignment feature 320 on the elongated connector body 310 configured for aligning the elongated connector body 310 with a connector guide 156, 400; a guide feature 330 on the elongated connector body 310 defining a unique orientation of the elongated connector body 310; and a retaining feature 340 on the elongated connector body 310 configured for retaining the elongated connector body 310 in the connector guide 165, 400, whereby the elongated connector body 310 when inserted into the connector guide 156, 400 may be aligned with the connector guide 156, 400 by the longitudinal alignment feature 320, may be in the unique orientation defined by the guide feature 330 and may be retained in the connector guide by the retaining feature 340. The longitudinal alignment feature 320 may include a raised longitudinal rib 320; or the guide feature 330 may include a raised guide member 330; or the longitudinal alignment feature 320 may include a raised longitudinal rib 320 and the guide feature 330 may include a raised guide member 330; or the retaining feature 340 may include at least one raised transverse rib 340; or the longitudinal alignment feature 320 may include a raised longitudinal rib 320 and the retaining feature 340 may include at least one raised transverse rib 340; or the guide feature 330 may include a raised guide member 330 and the retaining feature 340 may include at least one raised transverse rib 340; or the longitudinal alignment feature 320 may include a raised longitudinal rib 320 and the guide feature 330 may include a raised guide member 330 and the retaining feature 340 may include at least one raised transverse rib 340. The connector 164, 300 may be in combination with a connector guide 156, 400, the connector guide 400 may comprise: one or more guide members 400, 156 extending outwardly from a base 130, 130B adjacent a mating connector 152, 154 for the electrical connector frame 164P; the one or more guide members 400, 156 configured to be adjacent to the elongated connector body 310 to align the elongated connector body 310 and the mating connector 152, 154 when the electrical connector frame 164P mates with the mating connector 152, 154. The one or more guide members 400, 156 may have: a longitudinal alignment guide 420 complementary to the longitudinal alignment feature 320 of the elongated connector body 310; the longitudinal alignment guide 420 being configured to receive the guide feature 320 on the elongated connector body 310 when the elongated connector body 310 is in the defined unique orientation; a complementary retaining feature 440 configured to receive the retaining feature 340 on the elongated connector body 310 for retaining the elongated connector body 310 in the connector guide 156, 400 and mated to the mating connector 152, 154. The longitudinal alignment feature 320 on the elongated connector body 310 may include a raised alignment rib 320 configured for aligning with a groove 420 on an inward facing surface of the one or more guide members 156 of the connector guide 156, 400; the guide feature 330 on the elongated connector body 310 may include a raised guide 330 defining a unique orientation of the elongated connector body 310 and engages the groove 320 on an inward facing surface of the one or more guide members 156, 400; and the retaining feature 340 on the elongated connector body 310 may be a raised rib 340 or a recess 340 that engages a complementary recess 340 or raised rib 340 on an inward facing surface of the one or more guide members 156, 400. The connector body 310 may be a slip fit with the connector guide 156, 400 and the retaining feature 340 may be an interference fit or a snap fit with the connector guide 156, 400. The connector body 310 may be a slip fit with the connector guide 400, 156 and the retaining feature 340 may be an interference fit or a snap fit with the connector guide 400, 156. The connector frame 164P may include a USB connector frame 164P. The electrical connector 300, 400 may be configured to connect an external electrical power supply 168 to a charger housing 100, and the charger housing 100, 130 may include an electronic circuit 200 for determining the level of current available from the external power supply 168 via the electrical connector 300, 400, 152, 154 including: measuring 1200, 2350 a voltage provided by the external power supply 168; determining 1200, 2350 whether the voltage provided by the external power supply 168 is less than a predetermined voltage and, if so: decreasing 1250, 2355 the current drawn from the external power supply 168 by a predetermined amount; repeating the foregoing steps of measuring 1200, 2350, determining 1200, 2350 and decreasing 1250, 2355 until the voltage provided by the external power supply 168 is not less than the predetermined voltage. The electrical connector 300, 400 may be configured to connect a first external power supply 168 to a first electrical connector 152, 154 of a charger housing 130: the charger housing 130 including a second electrical connector 154, 152 configured for receiving electrical power from a second external electrical power supply 168, wherein the first electrical connector 152 and the second electrical connector 154 are closely adjacent each other such that an external electrical connector 162, 164, 300, 400 mated with the first electrical connector 152 or with the second electrical connector 154 physically interferes with and prevents an external electrical connector from being mated with the other of the first electrical connector 152 and the second electrical connector 154.

An electrical connector 154, 400 may comprise: an electrical connector frame 154 supported on a base 130, 130B and defining a longitudinal direction extending from the base 130, 130B; an alignment and retaining structure 400 including first and second opposing guide members 156 extending from the base 130, 130B in the longitudinal direction, the first and second opposing guide members 156 each having an inward facing surface that faces the other guide member 156, wherein the first and second guide members 156 are located spaced apart by a distance configured for an elongated connector body 310 to be placed therebetween with an electrical connector frame 164P of the elongated connector body 310 positioned to mate with the electrical connector frame 154 supported on the base 130, 130B; the first guide member 156 having on the inward facing surface thereof a longitudinal alignment feature 420 configured to align a complementary longitudinal alignment feature 320 of the connector body 310 with the electrical connector frame 154 supported on the base 130, 130B, wherein the longitudinal alignment feature 420 of the first guide member 156 is configured to receive a guide feature 330 on the elongated connector body 310 that defines a unique orientation of the elongated connector body 310; and at least one of the first and second guide members 156 having on the inward facing surface thereof a retaining feature 440 configured to engage a complementary retaining feature 340 of the elongated connector body 310 for retaining the elongated connector body 310 between the first and second guide members 156 with the electrical connector frame 164P of the elongated connector body 310 mated with the electrical connector frame 154 supported by the base 130, 130B, whereby the elongated connector body 310 when inserted to mate with the electrical connector frame 154 supported by the base 130, 130B is aligned therewith by the complementary longitudinal alignment features 320, 420, is in the unique orientation defined by the guide feature 330 and is retained between the first and second guide members 156 by the complementary retaining features 340, 440. The longitudinal alignment feature 420 of the first guide member 156 may include a longitudinal groove 420; or the retaining feature 440 of the at least one of the first and second guide members 156 may include a transverse rib or groove 440; or the longitudinal alignment feature 420 of the first guide member 156 may include a longitudinal groove 420 and the retaining feature 440 of the at least one of the first and second guide members 156 may include a transverse rib or groove 440. The electrical connector 154, 400 in combination with a mating electrical connector 164, 300 which may comprise: an elongated connector body 310 in the longitudinal direction and having an electrical cable 166 extending from the connector body 310; an electrical connector frame 164P at one end of the elongated connector body 310; a longitudinal alignment feature 420 on the elongated connector body 310 configured for aligning the elongated connector body 310 with the alignment feature 420 of the first guide member 156; a guide feature 330 on the elongated connector body 310 defining a unique orientation of the elongated connector body 310; and a retaining feature 340 on the elongated connector body 310 configured for engaging the at least one of the first and second guide members 156 for retaining the elongated connector body 310 in the first and second guide members 156, whereby the elongated connector body 310 when inserted between the first and second guide members 156 so that when the respective electrical connector frames 154, 164P thereof are mated the connector body 310 is aligned by the respective longitudinal alignment features 320, 420, is in the unique orientation defined by the guide feature 320 and is retained between the first and second connector guide members 156 by the respective retaining features 340, 440. The longitudinal alignment feature 420 of the first guide member 156 may be configured to receive the guide feature 330 on the elongated connector body 310 when the elongated connector body 310 is in the defined unique orientation. The longitudinal alignment feature 320 on the elongated connector body 310 may include a raised alignment rib 320 configured for aligning with a groove 420 on the inward facing surface of the first and second guide members 156; the guide feature 330 on the elongated connector body 310 may include a raised guide 330 on the alignment rib 320 defining a unique orientation of the elongated connector body 310 and may engage the groove 420 on the inward facing surface of the first and second guide members 156; and the retaining feature 340 on the elongated connector body 310 may be a raised rib 340 or a recess 340 that engages a complementary recess 440 or raised rib 440 on the inward facing surface of the first and second guide members 156. The elongated connector body 310 may be a slip fit with the first and second guide members 156 and the retaining feature 340 thereof may be an interference fit or a snap fit with the retaining feature 440 of the at least one of the first and second guide members 156. The electrical connector frame 154, 164P may include a USB connector frame. The base 130, 130B may include a charger housing 130 and the electrical connector frame 154 of the electrical connector 154 may be configured for receiving electrical power from an external electrical power supply 168, the charger housing 130 may include an electronic circuit 200 for determining the level of current available from the external power supply 168 via the electrical connector 154, 164, 300 including: measuring 1200, 2350 a voltage provided by the external power supply 168; determining 1200, 2350 whether the voltage provided by the external power supply 168 is less than a predetermined voltage and, if so: decreasing 1250, 2355 the current drawn from the external power supply 168 by a predetermined amount; repeating the foregoing steps of measuring 1200, 2350, determining 1200, 2350 and decreasing 1250, 2355 until the voltage provided by the external power supply 168 is not less than the predetermined voltage. The base 130, 130B may include a charger housing 130 and the electrical connector frame 154 of the electrical connector 154 may be configured for receiving electrical power from a first external electrical power supply 168, the charger housing 130 may include a second electrical connector 152 configured for receiving electrical power from a second external electrical power supply 168, wherein the electrical connector 154 and the second electrical connector 152 are closely adjacent each other such that an external electrical connector 164, 162 mated with the electrical connector 154 or with the second electrical connector 152 physically interferes with and prevents an external electrical connector 162, 164 from being mated with the other of the electrical connector 154 and the second electrical connector 152.

An electrical connector 164, 300 may comprise: a substantially rectangular elongated connector body 310 defining a longitudinal direction and having an electrical cable 166 extending from the elongated connector body 310; a USB connector frame 164P at one end of the elongated connector body 310; a longitudinal raised rib 320 on the elongated connector body 310 configured for aligning the elongated connector body 310 with a connector guide 400, 156 for a mating USB connector 154; a raised guide feature 330 on the raised rib 320 of the elongated connector body 310 defining a unique orientation of the elongated connector body 310; and at least one transverse rib 340 or transverse groove 340 on the elongated connector body 310 configured to engage the connector guide 400, 156 for retaining the elongated connector body 310 in the connector guide 400, 156, whereby the elongated connector body 310 when inserted into the connector guide 400, 156 for the mating USB connector 154 is aligned with the connector guide 400, 156 and the mating USB connector 154 by the longitudinal raised rib 320, is in the unique orientation defined by the raised guide feature 330 and is retained in the connector guide 400, 156 by the transverse rib 340 or transverse groove 340. The retaining feature 340 may include at least one raised transverse rib 340 and/or at least one transverse groove 340.

A pair of mating electrical connectors 154, 400, 164, 300 may comprise: a first electrical connector 164, 300 including: a substantially rectangular elongated connector body 310 defining a first longitudinal direction and having an electrical cable 166 extending from the elongated connector body 310; a first USB connector frame 164P at one end of the elongated connector body 310; a longitudinal raised rib 320 on the elongated connector body 310 configured for aligning the elongated connector body 310 with a connector guide 400, 156 for a mating USB connector 154; a raised guide feature 330 on the raised rib 320 of the elongated connector body 310 defining a unique orientation of the elongated connector body 310; and at least one transverse rib 340 or transverse groove 340 on the elongated connector body 310 configured to engage the connector guide 400, 156 for retaining the elongated connector body 310 in the connector guide 400, 156; and a second electrical connector 154, 400 including: a second USB electrical connector frame 154 supported on a base 130, 130B and defining a second longitudinal direction extending from the base 130, 130B; an alignment and retaining structure 400 including first and second opposing guide members 156 extending from the base 130, 130B in the second longitudinal direction, the first and second opposing guide members 156 each having an inward facing surface that faces the other guide member 156, wherein the first and second guide members 156 are located spaced apart by a distance configured for the elongated connector body 310 to be placed therebetween with the first USB electrical connector frame 164P of the elongated connector body 310 positioned to mate with the second USB electrical connector frame 154 supported on the base 130, 130B, whereby the first and second longitudinal directions are substantially aligned; the first guide member 156 having on the inward facing surface thereof a longitudinal groove 420 configured to align the complementary longitudinal raised rib 320 of the connector body 310 with the electrical connector frame 154 supported on the base 130, 130B, wherein the longitudinal groove 420 of the first guide member 156 is configured to receive the guide feature 330 on the elongated connector body 310 that defines a unique orientation of the elongated connector body 310; and at least one of the first and second guide members 156 having on the inward facing surface thereof a transverse rib 440 or transverse groove 440 configured to engage a complementary transverse groove 340 or transverse rib 340 of the elongated connector body 310 for retaining the elongated connector body 310 between the first and second guide members 156 with the first USB electrical connector frame 164P of the elongated connector body 310 mated with the second USB electrical connector frame 154 supported by the base 130, 130B, whereby the first USB electrical connector frame 164P of the elongated connector body 310 when inserted to mate with the second USB electrical connector frame 154 supported by the base 130, 130B is aligned therewith by the complementary longitudinal raised rib 320 and longitudinal groove 420, is in the unique orientation defined by the guide feature 330 and is retained between the first and second guide members 156 by the complementary transverse rib 340, 440 and transverse groove 340, 440, with the first and second longitudinal directions substantially aligned.

A method 1100, 2000 for charging at least one rechargeable battery 180, 190 connected to a battery charger 100 may comprise: a) determining 1300, 2075, 2155 whether a battery 180, 190 is present; b) setting 1400, 2070 an initial charge current level that is substantially lower than a charge current that the battery 180, 190 can accept; c) repetitively interrupting 1500, 1520, 2315, 2325 charging of the battery 180, 190 at a predetermined timing to define a periodic cycle, and for each periodic cycle: measuring 1525, 2315, 2325 an open circuit voltage of the battery 180, 190 when charging of the battery 180, 190 is interrupted 1500, 1520, 2315, 2325, determining 1540-1590, 2335, 2345 from the measured open circuit voltage of the battery 180, 190 a corresponding predetermined level of charging current to be applied to the battery 180, 190; applying charging current 1550, 2315-2345 to the battery 180, 190 at the predetermined level of charging current; and d) repeating the periodic cycle 1500, 2000 at least until the open circuit voltage of the battery 180, 190 is at a predetermined voltage indicative of the battery being fully charged 1580, 2085, 2165 or until the battery is disconnected 1530, 2315, 2325 from the battery charger 100. A method 1100, 2000 may further comprise determining 1200, 2350-2355 the level of current available from an external power supply 168 including: e) measuring 1200, 2350 a voltage provided by the external power supply; f) determining 1200, 2350 whether the voltage provided by the external power supply 168 is less than a predetermined voltage and, if so: g) decreasing 1250, 2355 the current drawn from the external power supply 168 by a predetermined amount; h) repeating 1200, 2000 the foregoing steps of e) measuring 1200, 2350, f) determining 1200, 2350 and g) decreasing 1250, 2355 until the voltage provided by the external power supply 168 is not less than the predetermined voltage. The method 1100, 2000 may further comprise setting 1250, 1545, 2360 a maximum charge current for the battery 180, 190 that is equal to or less than the level of current drawn from the external power supply 168 when the voltage provided by the external power supply 168 is not less than the predetermined voltage. In the method 1100, 2000, the initial charge current level may be at a level of current that is safe for applying to a battery 180, 190 irrespective of its temperature, or irrespective of its state of charge, or irrespective of its temperature and its state of charge. In the method 1100, 2000 the predetermined level of charging current to be applied to the battery 180, 190 may be substantially zero 1580, 1590, 2230, 2255 when the measured 1525 open circuit voltage of the battery 180, 190 is greater than or equal to a voltage indicative of full charge for the battery 180, 190. The method 1100, 2000 may further comprise: reducing 1590, 2230, 2255 the charging current applied to the battery 180, 190 substantially to zero for a period of time after the open circuit voltage of the battery 180, 190 is at a predetermined voltage indicative of the battery 180, 190 being fully charged; or reducing 1590, 2230, 2255 the charging current applied to the battery substantially to zero for a predetermined period of time after the open circuit voltage of the battery 180, 190 is at a predetermined voltage indicative of the battery 180, 190 being fully charged. The method 1100, 2000 may further comprise: applying 2230, 2255 charging current to the battery 180, 190 after the predetermined period of time or after the predetermined period of time at least until the open circuit voltage of the battery 180, 190 is at a predetermined voltage indicative of the battery being fully charged, thereby to top off the battery charge. The method 1100, 2000 with battery charger 100 in combination with an external source of electrical power 168 may further comprise: receiving electrical power from the external source of electrical power 168 via a first electrical connector 152, 154. The method 1100, 2000 may further comprise: employing a second electrical connector 152, 154 for receiving electrical power from a second external source of electrical power 168, wherein the first and second electrical connectors 152, 154 are closely adjacent each other such that an external electrical connector 162, 164, 300 inserted into one of the first and second electrical connectors 152, 154 physically interferes with and prevents an external electrical connector 162, 164, 300 from being plugged into the other of the first and second electrical connectors 152, 154. The first electrical connector 154 may include a connector guide 400, 156 and an electrical connector 164, 300 configured to mate therewith may comprise: an elongated connector body 310 defining a longitudinal direction and having an electrical cable 166 extending from the connector body 310; an electrical connector frame 164P at one end of the elongated connector body 310; a longitudinal alignment feature 320 on the elongated connector body 310 configured for aligning the elongated connector body 310 with the connector guide 400, 156; a guide feature 330 on the elongated connector body 310 defining a unique orientation of the elongated connector body 310; and a retaining feature 340 on the elongated connector body 310 configured for retaining the elongated connector body 310 in the connector guide 400, 156, whereby the elongated connector body 310 when inserted into the connector guide 400, 156 is aligned with the connector guide 400, 156 by the longitudinal alignment feature 320, is in the unique orientation defined by the guide feature 330 and is retained in the connector guide 400, 156 by the retaining feature 340.

A method 1100, 2000 for charging at least one rechargeable battery 180, 190 connected to a battery charger 100 may comprise: a) determining 1200, 2075, 2155 whether a battery is present; b) setting 1400, 2070 an initial charge current level that is substantially lower than a charge current that the battery 180, 190 can accept; c) determining 1200, 2305, 2355 the level of current available from an external power supply 168 including: i) measuring 1200, 2350 a voltage provided by the external power supply 168; ii) determining 1200, 2350 whether the voltage provided by the external power supply 168 is less than a predetermined voltage and, if so: iii) decreasing 1250, 2355 the current drawn from the external power supply 168 by a predetermined amount; d) repeating 1200, 2000 the foregoing steps of i) measuring 1200, 2350, determining 1200, 2350 and iii) decreasing 1250, 2355 until the voltage provided by the external power supply 168 is not less than the predetermined voltage. The method 1100, 2000 may further comprise setting 1250, 1545, 2360 a maximum charge current for the battery 180, 190 that is equal to or less than the level of current drawn from the external power supply 168 when the voltage provided by the external power supply 168 is not less than the predetermined voltage. The initial charge current level may be at a level of current that is safe for applying to a battery 180, 190 irrespective of its temperature, or irrespective of its state of charge, or irrespective of its temperature and its state of charge. The method 1100, 2000 may further comprise: e) repetitively interrupting 1500, 1520, 2315, 2325 charging of the battery 180, 190 at a predetermined timing to define a periodic cycle, and for each periodic cycle: measuring 1525, 2315, 2325 an open circuit voltage of the battery 180, 190 when charging of the battery 180, 190 is interrupted 1520, 2315, 2325, determining 1540-1590, 2335, 2345 from the measured open circuit voltage of the battery 180, 190 a corresponding predetermined level of charging current to be applied to the battery 180, 190; applying charging current 1550, 2315-2345 to the battery 180, 190 at the predetermined level of charging current; and f) repeating the periodic cycle 1500, 2000 at least until the open circuit voltage of the battery 180, 190 is at a predetermined voltage indicative of the battery 180, 190 being fully charged or until the battery 180, 190 is disconnected from the battery charger 100. The predetermined level of charging current to be applied to the battery 180, 190 may be substantially zero when the measured open circuit voltage of the battery 180, 190 is greater than or equal to a voltage indicative of full charge for the battery 180, 190. The method 1100, 2000 may further comprise: reducing 1590, 2230, 2255 the charging current applied to the battery 180, 190 substantially to zero for a period of time after the open circuit voltage of the battery 180, 190 is at a predetermined voltage indicative of the battery 180, 190 being fully charged; or reducing 1590, 2230, 2255 the charging current applied to the battery 180, 190 substantially to zero for a predetermined period of time after the open circuit voltage of the battery 180, 190 is at a predetermined voltage indicative of the battery 180, 190 being fully charged. The method further comprises: applying 2230, 2255 charging current to the battery 180, 190 after the predetermined period of time or after the predetermined period of time at least until the open circuit voltage of the battery 180, 190 is at a predetermined voltage indicative of the battery 180, 190 being fully charged, thereby to top off the battery charge. The method 1100, 2000 with battery charger 100 in combination with an external source of electrical power 168 may further comprise: receiving electrical power from the external source of electrical power 168 via a first electrical connector 152, 154. The method 1100, 2000 may further comprise: employing a second electrical connector 152, 154 for receiving electrical power from a second external source of electrical power 168, wherein the first and second electrical connectors 152, 154 are closely adjacent each other such that an external electrical connector 162, 164, 300 inserted into one of the first and second electrical connectors 152, 154 physically interferes with and prevents an external electrical connector 162, 164, 300 from being plugged into the other of the first and second electrical connectors 152, 154. The first electrical connector may include a connector guide 400, 16 and an electrical connector 162, 164, 300 configured to mate therewith may comprise: an elongated connector body 310 defining a longitudinal direction and having an electrical cable 166 extending from the connector body 310; an electrical connector frame 164P at one end of the elongated connector body 310; a longitudinal alignment feature 320 on the elongated connector body 310 configured for aligning the elongated connector body 310 with the connector guide 400, 156; a guide feature 330 on the elongated connector body 310 defining a unique orientation of the elongated connector body 310; and a retaining feature 340 on the elongated connector body 310 configured for retaining the elongated connector body 310 in the connector guide 400, 156, whereby the elongated connector body 310 when inserted into the connector guide 400, 156 is aligned with the connector guide 400, 156 by the longitudinal alignment feature 320, is in the unique orientation defined by the guide feature 320 and is retained in the connector guide 400, 156 by the retaining feature 340.

A method 1100, 2000 for charging at least one rechargeable battery 180, 190 connected to a battery charger 100 may comprise: a) determining 1300, 2075, 2155 whether a battery 180, 190 is present; b) setting 1400, 2070 an initial charge current level that is substantially lower than a charge current that the battery 180, 190 can accept;

c) determining 1200, 2305, 2355 the level of current available from an external power supply 168 including: i) measuring 1200, 2350 a voltage provided by the external power supply 168; ii) determining 1200, 2350 whether the voltage provided by the external power supply 168 is less than a predetermined voltage and, if so: iii) decreasing 1250, 2355 the current drawn from the external power supply 168 by a predetermined amount; d) repeating 1200, 2000 the foregoing steps of i) measuring 1200, 2350, ii) determining 1200, 2350 and iii) decreasing 1250, 2355 until the voltage provided by the external power supply 168 is not less than the predetermined voltage; and e) repetitively interrupting 1500, 1520, 2315, 2325 charging of the battery 180, 190 at a predetermined timing to define a periodic cycle, and for each periodic cycle: i) measuring 1525, 2315, 2325 an open circuit voltage of the battery 180, 190 when charging of the battery 180, 190 is interrupted 1500, 1520, 2315, 2325, ii) determining 1540-1590, 2335, 2345 from the measured open circuit voltage of the battery 180, 190 a corresponding predetermined level of charging current to be applied to the battery 180, 190; iii) applying charging current 1550, 2315-2345 to the battery 180, 190 at the predetermined level of charging current; and f) repeating the periodic cycle 1500, 2000 at least until the open circuit voltage of the battery 180, 190 is at a predetermined voltage indicative of the battery being fully charged 1580, 2085, 2165 or until the battery is disconnected 1530, 2315, 2325 from the battery charger 100.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such. It is noted that embodiments of very different sizes, shapes and dimensions may employ the described arrangements.

As used herein, the terms "electrical receptacle connector" and "electrical receptacle" and "receptacle" refers to an electrical connector and/or contacts, whether of the male or female type or of mixed types, that is associated with charger base or housing, e.g., typically disposed in a connector port thereof for receiving an electrical plug; and the terms "electrical plug connector" and "electrical plug" and "plug" refers to an electrical connector, whether of the male or female type or of mixed types, that is associated with an electrical power supply, e.g., with a housing thereof and/or a cable thereof.

Although terms such as "up," "down," "left," "right," "up," "down," "front," "rear," "side," "end," "top," "bottom," "forward," "backward," "under" and/or "over," "vertical," "horizontal," and the like may be used herein as a convenience in describing one or more embodiments and/or uses of the present arrangement, the articles described may be positioned in any desired orientation and/or may be utilized in any desired position and/or orientation. Such terms of position and/or orientation should be understood as being for convenience only, and not as limiting of the invention as claimed.

The term battery is used herein to refer to an electrochemical device comprising one or more electro-chemical cells and/or fuel cells, and so a battery may include a single cell or plural cells, whether as individual units or as a packaged unit. A battery is one example of a type of an electrical power source suitable for a portable or other device. Such devices could include power sources including, but not limited to, fuel cells, super capacitors, solar cells, and the like. Any of the foregoing may be intended for a single use or for being rechargeable or for both. The term battery 190 may be used to describe a battery 190 that is disposed in a flashlight 180 (as may be placed into a flashlight cradle, e.g., cradle 110), or a battery 190 not in a flashlight (as may be placed into a secondary cradle, e.g., cradle 120).

Various embodiments of a battery may have one or more battery cells, e.g., one, two, three, four, or five or more battery cells, as may be deemed suitable for any particular device. A battery may employ various types and kinds of battery chemistry types, e.g., a carbon-zinc, alkaline, lead acid, nickel-cadmium (Ni—Cd), nickel-metal-hydride (NiMH) or lithium-ion (Li-Ion) battery type, of a suitable number of cells and cell capacity for providing a desired operating time and/or lifetime for a particular device, and may be intended for a single use or for being rechargeable or for both. Examples may include a two cell lead acid battery typically producing about 4 volts, a three cell Ni—Cd battery typically producing about 3.6 volts, a four cell NiMH battery typically producing about 4.8 volts, a Lithium-Ion battery typically producing about 2.5 to 4.2 volts, it being noted that the voltages produced thereby will be higher when approaching full charge and will be lower when not fully charged and in discharge, particularly when providing higher current and when reaching a low level of remaining charge, e.g., becoming discharged.

The term DC converter is used herein to refer to any electronic circuit that receives at an input electrical power at one voltage and current level and provides at an output DC electrical power at a different voltage and/or current level. Examples may include a DC-DC converter, an AC-DC converter, a boost converter, a buck converter, a buck-boost converter, a single-ended primary-inductor converter (SEPIC), a series regulating element, a current level regulator, and the like. The input and output thereof may be DC coupled and/or AC coupled, e.g., as by a transformer and/or capacitor. A DC converter may or may not include circuitry for regulating a voltage and/or a current level, e.g., at an output thereof, and may have one or more outputs providing electrical power at different voltage and/or current levels and/or in different forms, e.g., AC or DC.

While the present invention has been described in terms of the foregoing example embodiments, variations within the scope and spirit of the present invention as defined by the claims following will be apparent to those skilled in the art. For example, while charger 100 is shown as having a cradle 110 configured to receive an electronic device, e.g., a flashlight, including a rechargeable battery and a cradle 120 (which can be optional) configured to receive a rechargeable battery, either cradle 110 or cradle 120 or both of cradles 110 and 120 can be configured to receive an electronic device, or to receive a rechargeable battery.

Further, either cradle 110 or cradle 120 or both of cradles 110 and 120 can be configured to receive an electronic device and a rechargeable battery one at a time, e.g., with suitable electrical contacts and/or positioning guides provided for cradle 110 and/or cradle 120. In other words, an electronic device can be placed into cradle 110 for recharging the battery therein or a battery apart from an electronic device can be placed into cradle 110 for recharging, cradle 110 being configured to have electrical contacts for making electrical connection to the electronic device and for making electrical contacts to the battery. In addition, cradle 120, if provided, may be similarly configured with electrical contacts for making electrical connection to an electronic device and to a battery.

Regarding connector port 150, while two different generally rectangular receptacles for receiving power supply plugs are illustrated, the different receptacles could be rectangular, square, trapezoidal, circular, oval, triangular, or any other shape. The mating plugs and receptacles may have complementary male pins, female pins, or a combination thereof, and may be of similar shape or of dissimilar shape.

Further, where a particular type of connector is shown, e.g., a USB connector, another type of connector could be provided The term USB connector is considered to encompass both plugs and receptacles, type A and B USB connectors, versions 1.x, 2.x and 3.x, and all other varieties thereof. Similarly, the relative positions of male and female connectors, e.g., receptacles and plugs, can be interchanged unless specifically stated otherwise, and further, a plug may be of either the male gender or the female gender and a receptacle may be of either the male gender or the female gender.

While the example electronic device 180 has an electrical switch 188S in the tail cap 186T thereof, the electrical switch could be located internally forward of battery 190 and actuator 188 could move battery 190 forward so that the forward end thereof actuates an electrical switch associated, e.g., with circuit board thereof, or a switch and/or actuator could be provided on another location on light 180.

Raised and recess features intended to engage may be interchanged, e.g., a raised feature may be provided where a recess feature is shown herein and a corresponding recess feature may be provided where a corresponding raised feature is shown. Alternatively, raised and recessed features may both be utilized, e.g., as for retaining features 340 of connector 300 and the complementary retaining features 440 of guides 156, 400.

While certain features may be described as a raised feature, e.g., a ridge, boss, flange, projection or other raised feature, such feature may be positively formed or may be what remains after a recessed feature, e.g., a groove, slot, hole, indentation, recess or other recessed feature, is made. Similarly, while certain features may be described as a recessed feature, e.g., a groove, slot, hole, indentation, recess or other recessed feature, such feature may be positively formed or may be what remains after a raised feature, e.g., a ridge, boss, flange, projection or other raised feature, is made.

While connector body 310 is substantially rectangular as illustrated, with various features 312, 320, 330, 340 added thereto, other shapes could also be employed, e.g., substantially cylindrical with a circular, elliptical or oval cross-section, triangular, hexagonal, and so forth.

Each of the U.S. Provisional Applications, U.S. Patent Applications, and/or U.S. Patents, identified herein is hereby incorporated herein by reference in its entirety, for any purpose and for all purposes irrespective of how it may be referred to or described herein.

Finally, numerical values stated are typical or example values, are not limiting values, and do not preclude substantially larger and/or substantially smaller values. Values in any given embodiment may be substantially larger and/or may be substantially smaller than the example or typical values stated.

What is claimed is:

1. A method for charging at least one rechargeable battery connected to a battery charger, the method comprising:
   a) determining whether a battery is present;
   b) setting an initial charge current level that is substantially lower than a charge current that the battery can accept;
   c) repetitively interrupting charging of the battery at a predetermined timing to define a periodic cycle, and for each periodic cycle:
      measuring an open circuit voltage of the battery when charging of the battery is interrupted,
      determining from the measured open circuit voltage of the battery a corresponding predetermined level of charging current to be applied to the battery; and
      applying charging current to the battery at the corresponding predetermined level of charging current; and
   d) repeating the periodic cycle of step c) at least until the open circuit voltage of the battery is at a predetermined voltage indicative of the battery being fully charged or until the battery is disconnected from the battery charger.

2. The method of claim 1 further comprising determining a level of current available from an external power supply including:
   e) measuring a voltage provided by the external power supply;
   f) determining whether the voltage provided by the external power supply is less than a predetermined voltage and, if so:
   g) decreasing a current drawn from the external power supply by a predetermined amount; and
   h) repeating the foregoing steps of e) measuring, f) determining and g) decreasing until the voltage provided by the external power supply is not less than the predetermined voltage.

3. The method of claim 2 further comprising setting a maximum charge current for the battery that is:
   equal to or less than the level of current available from the external power supply; or
   equal to or less than the level of current drawn from the external power supply when the voltage provided by the external power supply is not less than the predetermined voltage.

4. The method of claim 1 wherein the initial charge current level is at a level of current that is safe for applying to a battery irrespective of its temperature, or irrespective of its state of charge, or irrespective of its temperature and its state of charge.

5. The method of claim 1 wherein the initial charge current level is substantially zero if a temperature is not within a predetermined range of temperature or if battery voltage is at or above the predetermined voltage indicative of the battery being fully charged.

6. The method of claim 5 wherein thereafter the charge current is set to a predetermined test current level to verify that the battery is in a condition to accept charging in accordance with steps c) and d) of claim 1.

7. The method of claim 1 wherein the corresponding predetermined level of charging current to be applied to the battery is substantially zero when the measured open circuit voltage of the battery is greater than or equal to a voltage indicative of full charge for the battery.

8. The method of claim 1 further comprising:
   reducing the charging current applied to the battery substantially to zero for a period of time after the open circuit voltage of the battery is at a predetermined voltage indicative of the battery being fully charged; or
   reducing the charging current applied to the battery substantially to zero for a predetermined period of time after the open circuit voltage of the battery is at a predetermined voltage indicative of the battery being fully charged.

9. The method of claim 8 further comprising:
   applying charging current to the battery after the predetermined period of time; or
   applying charging current to the battery after the predetermined period of time at least until the open circuit voltage of the battery is at a predetermined voltage indicative of the battery being fully charged, thereby to top off the battery charge.

10. The method of claim 1 with the battery charger in combination with an external source of electrical power, said method further comprising:
    receiving electrical power from the external source of electrical power via a first electrical connector.

11. The method of claim 10 further comprising:
    employing a second electrical connector for receiving electrical power from a second external source of electrical power, wherein the first electrical connector and the second electrical connector are closely adjacent each other such that an external electrical connector inserted into one of the first electrical connector and the second electrical connector physically interferes with and prevents another external electrical connector from being plugged into the other of the first electrical connector and the second electrical connector.

12. The method of claim 10 wherein said first electrical connector includes a connector guide and wherein an electrical connector configured to mate therewith comprises:
    an elongated connector body defining a longitudinal direction and having an electrical cable extending from the elongated connector body;
    an electrical connector frame at one end of said elongated connector body;
    a longitudinal alignment feature on said elongated connector body configured for aligning said elongated connector body with the connector guide;
    a guide feature on said elongated connector body defining a unique orientation of said elongated connector body; and
    a retaining feature on said elongated connector body configured for retaining said elongated connector body in the connector guide,
    whereby said elongated connector body when inserted into the connector guide is aligned with the connector guide by the longitudinal alignment feature, is in the unique orientation defined by said guide feature and is retained in the connector guide by said retaining feature.

13. A method for charging at least one rechargeable battery connected to a battery charger, the method comprising:

a) determining whether a battery is present;
b) setting an initial charge current level that is substantially lower than a charge current that the battery can accept;
c) determining a level of current available from an external power supply including:
   i) measuring a voltage provided by the external power supply;
   ii) determining whether the voltage provided by the external power supply is less than a predetermined voltage and, if so:
   iii) decreasing a current drawn from the external power supply by a predetermined amount;
d) repeating the foregoing steps of i) measuring, ii) determining and iii) decreasing of step c) until the voltage provided by the external power supply is not less than the predetermined voltage.

14. The method of claim 13 further comprising setting a maximum charge current for the battery that is:
   equal to or less than the level of current available from the external power supply; or
   equal to or less than the level of current drawn from the external power supply when the voltage provided by the external power supply is not less than the predetermined voltage.

15. The method of claim 13 wherein the initial charge current level is at a level of current that is safe for applying to a battery irrespective of its temperature, or irrespective of its state of charge, or irrespective of its temperature and its state of charge.

16. The method of claim 13 further comprising:
e) repetitively interrupting charging of the battery at a predetermined timing to define a periodic cycle, and for each periodic cycle:
   measuring an open circuit voltage of the battery when charging of the battery is interrupted,
   determining from the measured open circuit voltage of the battery a corresponding predetermined level of charging current to be applied to the battery; and
   applying charging current to the battery at the corresponding predetermined level of charging current; and
f) repeating the periodic cycle of step e) at least until the open circuit voltage of the battery is at a predetermined voltage indicative of the battery being fully charged or until the battery is disconnected from the battery charger.

17. The method of claim 16 wherein the initial charge current level is substantially zero if a temperature is not within a predetermined range of temperature or if battery voltage is at or above the predetermined voltage indicative of the battery being fully charged.

18. The method of claim 17 wherein thereafter the charge current is set to a predetermined test current level to verify that the battery is in a condition to accept charging in accordance with steps c) and d) of claim 13.

19. The method of claim 16 wherein the corresponding predetermined level of charging current to be applied to the battery is substantially zero when the measured open circuit voltage of the battery is greater than or equal to a voltage indicative of full charge for the battery.

20. The method of claim 16 further comprising:
reducing the charging current applied to the battery substantially to zero for a period of time after the open circuit voltage of the battery is at a predetermined voltage indicative of the battery being fully charged; or
reducing the charging current applied to the battery substantially to zero for a predetermined period of time after the open circuit voltage of the battery is at a predetermined voltage indicative of the battery being fully charged.

21. The method of claim 20 further comprising:
applying charging current to the battery after the predetermined period of time; or
applying charging current to the battery after the predetermined period of time at least until the open circuit voltage of the battery is at a predetermined voltage indicative of the battery being fully charged, thereby to top off the battery charge.

22. The method of claim 13 with the battery charger in combination with an external source of electrical power, said method further comprising:
receiving electrical power from the external source of electrical power via a first electrical connector.

23. The method of claim 22 further comprising:
employing a second electrical connector for receiving electrical power from a second external source of electrical power, wherein the first electrical connector and the second electrical connector are closely adjacent each other such that an external electrical connector inserted into one of the first electrical connector and the second electrical connector physically interferes with and prevents another external electrical connector from being plugged into the other of the first electrical connector and the second electrical connector.

24. The method of claim 22 wherein said first electrical connector includes a connector guide and wherein an electrical connector configured to mate therewith comprises:
an elongated connector body defining a longitudinal direction and having an electrical cable extending from the elongated connector body;
an electrical connector frame at one end of said elongated connector body;
a longitudinal alignment feature on said elongated connector body configured for aligning said elongated connector body with the connector guide;
a guide feature on said elongated connector body defining a unique orientation of said elongated connector body; and
a retaining feature on said elongated connector body configured for retaining said elongated connector body in the connector guide,
whereby said elongated connector body when inserted into the connector guide is aligned with the connector guide by the longitudinal alignment feature, is in the unique orientation defined by said guide feature and is retained in the connector guide by said retaining feature.

25. A method for charging at least one rechargeable battery connected to a battery charger, the method comprising:
a) determining whether a battery is present;
b) setting an initial charge current level that is substantially lower than a charge current that the battery can accept;
c) determining a level of current available from an external power supply including:
   i) measuring a voltage provided by the external power supply;
   ii) determining whether the voltage provided by the external power supply is less than a predetermined voltage and, if so:

iii) decreasing a current drawn from the external power supply by a predetermined amount;

d) repeating the foregoing steps of i) measuring, ii) determining and iii) decreasing of step c) until the voltage provided by the external power supply is not less than the predetermined voltage; and e) repetitively interrupting charging of the battery at a predetermined timing to define a periodic cycle, and for each periodic cycle:
   i) measuring an open circuit voltage of the battery when charging of the battery is interrupted,
   ii) determining from the measured open circuit voltage of the battery a corresponding predetermined level of charging current to be applied to the battery;
   iii) applying charging current to the battery at the corresponding predetermined level of charging current; and f) repeating the steps i) measuring, ii) determining and iii) applying of the periodic cycle of step e) at least until the open circuit voltage of the battery is at a predetermined voltage indicative of the battery being fully charged or until the battery is disconnected from the battery charger.

* * * * *